(12) United States Patent
Taguchi et al.

(10) Patent No.: US 7,201,477 B2
(45) Date of Patent: Apr. 10, 2007

(54) INK FOR INK JET RECORDING, INK SET FOR INK JET RECORDING AND INK JET RECORDING METHOD

(75) Inventors: Toshiki Taguchi, Fujinomiya (JP); Manabu Ogawa, Fujinomiya (JP); Takashi Ozawa, Fujinomiya (JP)

(73) Assignee: Fujifilm Corporation, Tokyo (JP)

( * ) Notice: Subject to any disclaimer, the term of this patent is extended or adjusted under 35 U.S.C. 154(b) by 117 days.

(21) Appl. No.: 10/502,388

(22) PCT Filed: Jan. 23, 2003

(86) PCT No.: PCT/JP03/00604

§ 371 (c)(1),
(2), (4) Date: Jul. 26, 2004

(87) PCT Pub. No.: WO02/083795

PCT Pub. Date: Oct. 24, 2002

(65) Prior Publication Data

US 2005/0057629 A1    Mar. 17, 2005

(30) Foreign Application Priority Data

| Jan. 25, 2002 | (JP) | 2002-017016 |
| Jan. 25, 2002 | (JP) | 2002-017066 |
| Jan. 25, 2002 | (JP) | 2002-017333 |
| Feb. 8, 2002 | (JP) | 2002-032843 |
| Feb. 12, 2002 | (JP) | 2002-034363 |
| Feb. 13, 2002 | (JP) | 2002-035277 |

(51) Int. Cl.
*G01D 11/00* (2006.01)

(52) U.S. Cl. ............... 347/100; 347/95; 106/31.27

(58) Field of Classification Search ............... 347/100, 347/95, 96, 101; 523/160; 106/31.6, 31.27, 106/31.13
See application file for complete search history.

(56) References Cited

U.S. PATENT DOCUMENTS 6,835,240 B2 *  12/2004  Nishita et al. ........... 106/31.48
2001/0029869 A1 *  10/2001  Fujiwara .................. 106/31.49

(Continued)

FOREIGN PATENT DOCUMENTS

EP       20161 A2       12/1980

(Continued)

OTHER PUBLICATIONS

International Search Report for PCT/JP03/00604 dated Mar. 25, 2003.

(Continued)

*Primary Examiner*—Manish S. Shah
(74) *Attorney, Agent, or Firm*—Sughrue Mion, PLLC

(57) ABSTRACT

An ink for ink jet recording including a magenta dye selected from azo dyes dissolved or dispersed in an aqueous medium, characterized in that said magenta dye is a dye having an absorption maximum in a spectral range of from 500 to 580 nm in said aqueous medium and a more positive oxidation potential than 1.0V (vs SCE), particularly with the aforesaid ink for ink jet recording wherein the azo dye has a specific structure having a 5-membered heterocyclic ring and a 4-amino-6-membered heterocyclic ring connected to the azo group.

16 Claims, 2 Drawing Sheets

U.S. PATENT DOCUMENTS

2002/0107301 A1* 8/2002 Yamanouchi et al. ....... 523/160
2004/0089200 A1* 5/2004 Fujiwara et al. ......... 106/31.48

FOREIGN PATENT DOCUMENTS

| EP | 0 346 729 A2 | 12/1989 |
| EP | 1 081 198 A2 | 3/2001 |
| EP | 1 251 154 A1 | 10/2002 |
| JP | 2003-64275 A | 3/2003 |
| WO | WO 96/34916 A2 | 11/1996 |
| WO | WO 02/083662 A2 | 10/2002 |
| WO | WO 02/083795 A2 | 10/2002 |

OTHER PUBLICATIONS

Supplementary European Search Report dated Jul. 5, 2006.

* cited by examiner

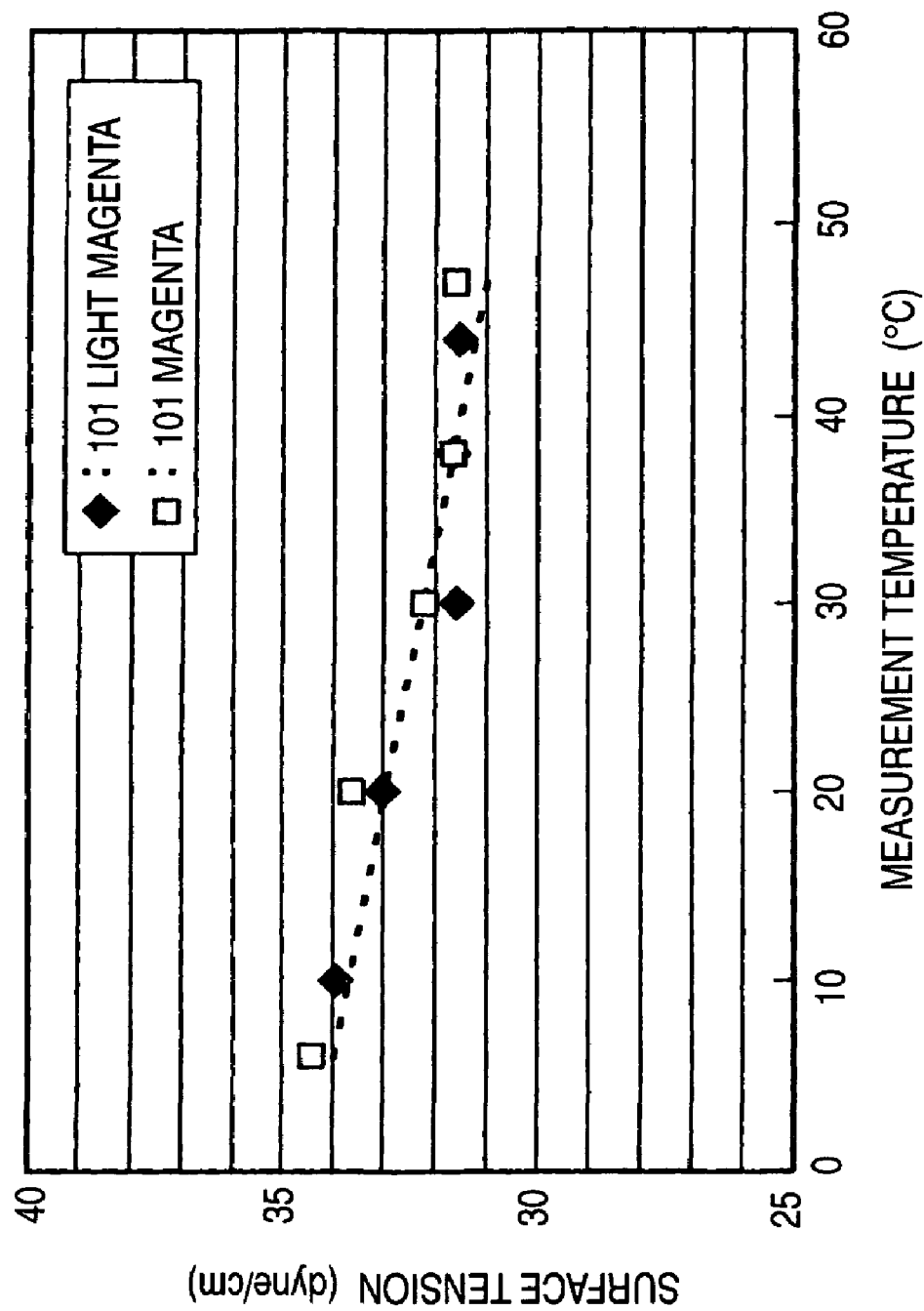

INK FOR INK JET RECORDING, INK SET FOR INK JET RECORDING AND INK JET RECORDING METHOD

TECHNICAL FIELD

The present invention relates to an ink for ink jet recording and a recording method using same and more particularly to a magenta ink for ink jet recording which can provide a recorded image having an excellent preservability and a high image quality such as hue and color density and exhibits an excellent ink ejection stability.

BACKGROUND ART

In recent years, with the spread of computers, ink jet printers have been widely used to print on paper, film, cloth, etc. at offices as well as at home.

Examples of ink jet recording method include a method which allows a piezoelectric element to give pressure that causes a droplet to be ejected, a method which comprises heating the ink to generate bubbles, causing a droplet to be ejected, a method involving the use of ultrasonic wave, and a method which uses electrostatic force to suck and discharge a droplet. As inks for these ink jet recording methods there are used aqueous inks, oil-based inks and solid (melt type) inks. Among these inks, aqueous inks are mainly used currently because they are relatively better than oil-based inks and solid (melt type) inks from the standpoint of possibility of attaining producibility, handleability, odor, safety, etc.

The dyes to be incorporated in these inks for ink jet recording are required to exhibit a high solubility in solvents (ink medium), allow a high density recording and have a good hue and an excellent fastness to light, heat, air, water and chemical, a good fixability to image-receiving materials, difficulty in running, an excellent preservability as an ink, no toxicity and a high purity and be available at a low cost. However, it is extremely difficult to seek coloring agents meeting these requirements to a high extent. In particular, excellent hue and fastness are contrary to each other in most cases, making it difficult to obtain coloring materials for magenta ink that can satisfy the aforesaid requirements and particularly difficult to find out dyestuffs which exhibit a good magenta hue and a light fastness high enough to withstand an oxidizing atmosphere at the same time.

Accordingly, although various dyes or dyestuffs for ink jet have been already proposed and practically used, it is the present situation that no dyestuffs that satisfying all the aforesaid requirements have been found yet.

Known dyes and pigments provided with color index (C.I.) number can difficultly satisfy both the hue and fastness requirements for inks for ink jet recording.

As a dye which can enhance fastness there has been proposed an azo dye derived from an aromatic amine and a 5-membered heterocyclic amine described in Patent Reference 1 cited below. However, these dyes have an undesirable hue in the yellow and cyan ranges and thus are disadvantageous in that they deteriorate color reproducibility.

Patent References 2 and 3 cited below disclose inks for ink jet recording for the purpose of accomplishing both hue and light fastness. However, the dyestuffs used in these publications have an insufficient water solubility when used as water-soluble ink. Further, the dyestuffs described in these publications are disadvantageous also in wet heat fastness when used as water-soluble ink for ink jet.

As means for solving these problems there have been proposed an improved magenta dyestuff and an ink composition using the same described in Patent Reference 4 cited below. Further, an ink for ink jet recording which comprises a pyrazolylaniline azo dyestuff to improve hue and light fastness is also described (Patent Reference 5 cited below). However, these inks for ink jet recording leave something to be desired both in color reproducibility and fastness of output image.

Further, it was made obvious that there are some cases where an image recorded on a gloss paper of photographic image quality dedicated to ink jet exhibits a remarkably poor image preservability when put on the wall of a indoor room. The present inventors presume that this phenomenon is attributed to some oxidizing gases such as ozone in the air. Further, the blockade of air flow such as by enclosure in a glass frame makes it difficult for this phenomenon to occur, but this limits the working conditions.

This phenomenon is remarkable particularly with gloss paper of photographic image quality dedicated to ink jet and thus raises a great problem with the current ink jet recording process, which is required to provide a desired photographic quality image as one of important features.

[List of Patent References of Related art]
[Patent Reference 1]
JP-A-55-161856
[Patent Reference 2]
JP-A-61-36362
[Patent Reference 3]
JP-A-2-212566
[Patent Reference 4]
JP-T-11-504958
[Patent Reference 5]
JP-A-2000-80733

An aim of the present invention is to solve the problems with ink for ink jet recording described above with reference to the related art technique and more specifically is to provide a magenta ink for ink jet recording excellent in weathering resistance. An additional object of the present invention is to provide a magenta ink for ink jet recording which is preferably provided with a hue as magenta ink, exhibits a high stability in ejection and causes no defects in water resistance and image quality in addition to the aforesaid requirement.

DISCLOSURE OF THE INVENTION

The objects of the present invention were accomplished with an ink for ink jet recording as described in the following Clauses (1) to (13), particularly an ink for ink jet recording containing a dye described in Clauses (1) to (6). These inks for ink jet recording can be produced by the method of the following Clauses (14) and (15) Advantages of the invention can be exhibited when these inks for ink jet recording are used to record an image on the image-receiving layer of the image-receiving material described in the following Clauses (16) to (19).

(1). An ink for ink jet recording, comprising an aqueous medium and a magenta dye dissolved or dispersed in the aqueous medium, the magenta dye being selected from azo dyes, wherein the magenta dye has an absorption maximum in a spectral range of from 500 to 580 nm in the aqueous medium and an oxidation potential of more positive than 1.0 V (vs SCE).

(2). The ink for ink jet recording according to claim 1, wherein the azo dye has a chromophore represented by the following formula:

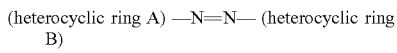

wherein, the heterocyclic ring A and the heterocyclic ring B may be a same structure.

(3). The ink for ink jet recording according to Claim 1 or 2, wherein the azo dye contains an azo group having an aromatic nitrogen-containing 6-membered heterocyclic ring that is directly connected to at least one end of the azo group as a coupling component.

(4). The ink for ink jet recording according to any one of Claims 1 to 3, wherein the azo dye has one of an aromatic cyclic amino group and a heterocyclic amino group-containing structure as an auxochrome.

(5). The ink for ink jet recording according to any one of Claims 1 to 4, wherein the azo dye has a stereostructure.

(6). The ink for ink jet recording according to any one of Claims 1 to 5, wherein the azo dye is a dye represented by the following formula (1):

Formula (1)

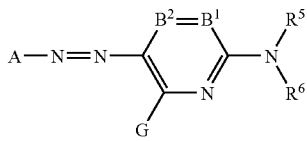

wherein A represents a 5-membered heterocyclic ring group; $B^1$ and $B^2$ each represents $=CR^1-$ or $-CR^2=$ or one of $B^1$ and $B^2$ represents a nitrogen atom while other represents $=CR^1-$ or $-CR^2=$; $R^5$ and $R^6$ each independently represents a hydrogen atom or a substituent which is an aliphatic group, an aromatic group, a heterocyclic ring, an acyl group, an alkoxycarbonyl group, an aryloxycarbonyl group, a carbamoyl group, an alkylsulfonyl group, an arylsulfonyl group or a sulfamoyl group, a hydrogen atom of the substituent may be substituted; G, $R^1$ and $R^2$ each independently represents a hydrogen atom or a substituent which is a halogen atom, an aliphatic group, an aromatic group, a heterocyclic ring group, a cyano group, a carboxyl group, a carbamoyl group, an alkoxycarbonyl group, an aryloxycarbonyl group, a heterocyclic oxycarbonyl group, an acyl group, a hydroxy group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group, an acylamino group, an ureido group, a sulfamoylamino group, an alkoxycarbonylamino group, an aryloxycarbonylamino group, an alkylsulfonylamino group, an arylsulfonylamino group, a heterocyclic sulfonylamino group, a nitro group, an alkylthio group, an arylthio group, a heterocyclic thio group, an alkylsulfonyl group, an arylsulfonyl group, a heterocyclic sulfonyl group, an alkylsulfinyl group, an arylsulfinyl group, a heterocyclic sulfinyl group, a sulfamoyl group or a sulfo group, wherein a hydrogen atom of the substituent may be substituted; and $R^1$ and $R^5$ or $R^5$ and $R^6$ may be connected to each other to form a 5- or 6-membered ring.

(7). The ink for ink jet recording according to any one of Claims 1 to 6, wherein the ink has an ozone fading rate constant of a recorded image, the ozone fading rate constant is $5.0 \times 10^{-2}$ [$hr^{-1}$] or less.

(8). The ink for ink jet recording according to any one of Claims 1 to 7, which has a viscosity of from 1 to 20 mPa·sec at 25° C.

(9). The ink for ink jet recording according to any one of Claims 1 to 8, which has a static surface tension of from 25 to 50 mN/m at 25° C.

(10). The ink for ink jet recording according to any one of Claims 1 to 9, which has an electrical conductance of from 0.01 to 10 S/m.

(11). The ink for ink jet recording according to any one of Claims 1 to 10, wherein a change of a viscosity and a surface tension of the ink from at 25° C. to at 10° C. are 250% or less and 130% or less, respectively.

(12). The ink for ink jet recording according to any one of Claims 1 to 11, wherein the ink has no visibly detectable bleeding on an image-receiving material at a visible distance, the image-receiving material comprises an image-receiving layer on a support, and the image-receiving layer contains a white inorganic pigment particle.

(13). The ink for ink jet recording according to any one of Claims 1 to 12, which has no visibly detectable bleeding on an image-receiving material at a visible distance, the image-receiving material comprising a gelatin-containing hardened layer as an image-recording layer.

(14). A method for producing the ink for ink jet recording according to any one of Claims 1 to 13, which comprises a step of dissolving or dispersing the azo dye according to any one of Claims 1 to 6 in the aqueous medium with an ultrasonic agitation.

(15). A method for producing the ink for ink jet recording according to any one of Claims 1 to 13, which comprises steps of: filtering the aqueous medium having the azo dye according to any one of Claims 1 to 6 dissolved or dispersed in the aqueous medium through a filter having an effective pore diameter of 1 μm or less; and defoaming the filtered aqueous medium.

(16). An ink jet recording method using the ink for ink jet recording according to any one of Claims 1 to 13.

(17). The ink jet recording method according to Claim 16, wherein an ink droplet is ejected onto an image-receiving material in accordance with a recording signal so that an image is recorded on the image-receiving material by using the ink for ink jet recording according to any one of Claims 1 to 13, the image-receiving material comprising an image-receiving layer on a support, the image-receiving layer containing a white inorganic pigment particle.

(18). The ink jet recording method according to Claim 17, wherein the image-receiving layer contains the white inorganic pigment particle and at least one aqueous binder selected from a polyvinyl alcohol, a silanol-modified polyvinyl alcohol, a starch, a cationated starch, a gelatin, a carboxyalkyl cellulose, a casein and a polyvinyl pyrrolidone.

(19). The ink jet recording method according to Claim 18, wherein the image-receiving layer further contains a mordant selected from a polyaluminum chloride, a chromium compound and an azo dye-mordanting group-containing polymer.

BRIEF DESCRIPTION OF THE DRAWINGS

FIG. 2 is a diagram illustrating the temperature dependence of the surface tension of the light magenta ink and magenta ink of Ink set 101 (see Example 6).

BEST MODE FOR CARRYING OUT THE PRESENT INVENTION

Figure 1:
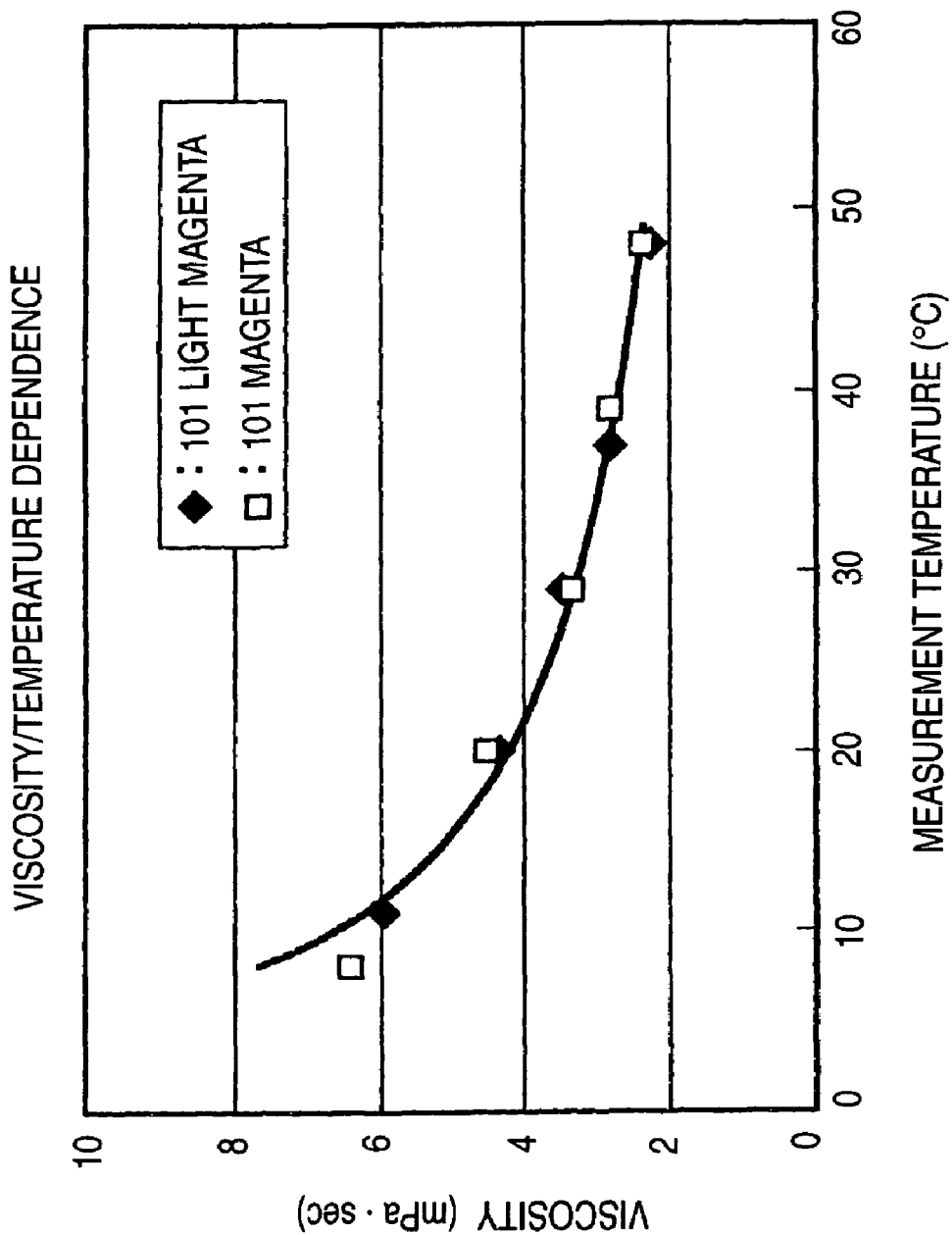
FIG. 1 is a diagram illustrating the temperature dependence of the viscosity of the light magenta ink and magenta ink of Ink set 101 (see Example 6).

Specific embodiments of implementation of the present invention will be described in detail hereinafter.

In order to provide an ink for ink jet recording with properties which are objects of the present invention, i.e., excellent weathering resistance, desired hue, high ejection stability and no defects in water resistance and image quality, image recording is conducted with a dye having the properties described in the following Clauses (1) to (6) as a magenta ink. Accordingly, a magenta dye will be described with reference to these properties.

The magenta ink for use in the ink for ink jet recording of the present invention is essentially characterized in that it comprises a magenta dye selected from azo dyes dissolved or dispersed in an aqueous medium and is a dye having an absorption maximum in a spectral range of from 500 to 580 nm in said aqueous medium and a more positive oxidation potential than 1.0 V (vs SCE).

The first structural characteristic of preferred dye of this azo dye is that it is a dye having a chromophore represented by the formula (heterocyclic ring A) —N=N— (heterocyclic ring B). In this case, the heterocyclic ring A and the heterocyclic ring B may have the same structure. The heterocyclic ring A and heterocyclic ring B each are in detail a 5- or 6-membered heterocyclic ring which is selected from pyrazole, imidazole, triazole, oxazole, thiazole, selenazole, pyridone, pyrazine, pyrimidine and pyridine. In some detail, they are described in Japanese Patent Application 2000-15853, Japanese Patent Application 2001-15614, JP-A-2002-309116, Japanese Patent Application 2001-195014, etc.

Further, the second preferred structural characteristic of the aforesaid azo dye is that the azo group is an azo dye having an aromatic nitrogen-containing 6-membered heterocyclic ring directly connected to at least one end thereof as a coupling component, and specific examples of such an azo dye are described in 2001-110457.

The third preferred structural characteristic is that the auxochrome has an aromatic cyclic amino group or heterocyclic amino group structure, and specific examples of the auxochrome include anilino group, and heterylamino group.

The fourth preferred structural characteristic is that the azo dye has a stereostructure. This is described in detail in Japanese Patent Application 2002-12015.

Most desirable among the aforesaid preferred structural characteristics of the azo dye from the standpoint of accomplishment of the objects of the present invention is a dye represented by the following formula (1):

Formula (1)

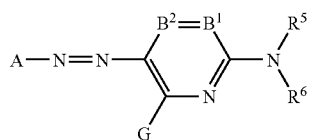

In the formula (1), A represents a 5-membered heterocyclic ring.

$B^1$ and $B^2$ each represents =CR$^1$— or —CR$^2$= or one of $B^1$ and $B^2$ represents a nitrogen atom while the other represents =CR$^1$— or —CR$^2$=. $R^5$ and $R^6$ each independently represents a hydrogen atom or a substituent which is an aliphatic group, aromatic group, heterocyclic ring, acyl group, alkoxycarbonyl group, aryloxycarbonyl group, carbamoyl group, alkylsulfonyl group, arylsulfonyl group or sulfamoyl group, the hydrogen atom of the substituent may be substituted.

G, $R^1$ and $R^2$ each independently represents a hydrogen atom or a substituent which is a halogen atom, aliphatic group, aromatic group, heterocyclic ring, cyano group, carboxyl group, carbamoyl group, alkoxycarbonyl group, aryloxycarbonyl group, heterocyclic oxycarbonyl group, acyl group, hydroxy group, alkoxy group, aryloxy group, heterocyclic oxy group, silyloxy group, acyloxy group, carbamoyloxy group, alkoxycarbonyloxy group, aryloxycarbonyloxy group, amino group, acylamino group, ureido group, sulfamoylamino group, alkoxycarbonylamino group, aryloxycarbonylamino group, alkylsulfonylamino group, arylsulfonylamino group, heterocyclic sulfonylamino group, nitro group, alkylthio group, arylthio group, heterocyclic thio group, alkylsulfonyl group, arylsulfonyl group, heterocyclic sulfonyl group, alkylsulfinyl group, arylsulfinyl group, heterocyclic sulfinyl group, sulfamoyl group or sulfo group, the hydrogen atom of the substituent may be substituted.

$R^1$ and $R^5$ or $R^5$ and $R^6$ may be connected to each other to form a 5- or 6-membered ring.

The dye of the formula (1) will be further described in detail.

In the formula (1), A represents a 5-membered heterocyclic ring and examples of hetero atoms in the heterocyclic ring include N, O and S. The 5-membered heterocyclic ring is preferably a nitrogen-containing 5-membered heterocyclic ring, which may be condensed with aliphatic rings, aromatic rings or other heterocyclic rings. Preferred examples of the heterocyclic ring of A may include pyrazole ring, imidazole ring, thiazole ring, isothiazole ring, thiadiazole ring, benzothiazole ring, benzooxazole ring, and benzoisothiazole ring. The various heterocyclic groups may further have substituents. Preferred among these heterocyclic rings are pyrazole ring, imidazole ring, isothiazole ring, thiadiazole ring and benzothiazole ring represented by the following formulae (a) to (f):

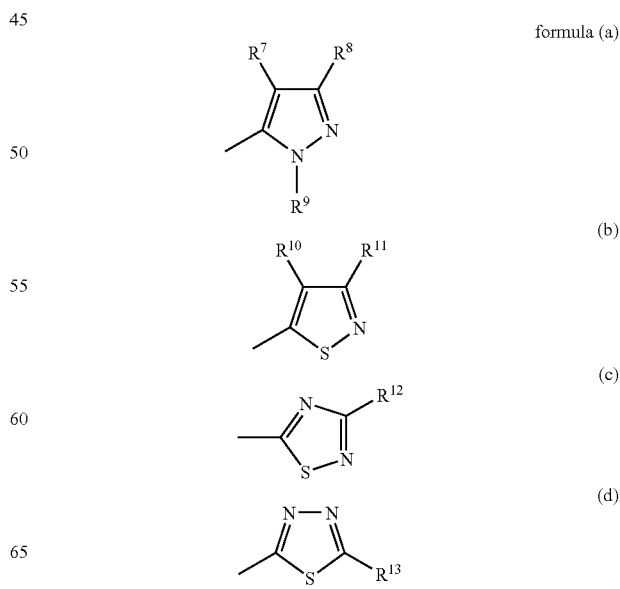

-continued

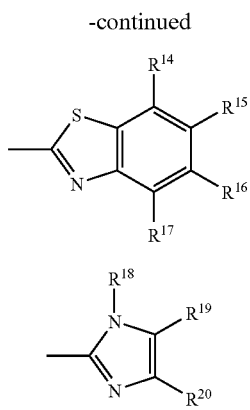

(e)

(f)

In the aforesaid formulae (a) to (f), $R^7$ to $R^{20}$ represent the same substituents as G, $R^1$ and $R^2$ in the formula (1).

Preferred among the formulae (a) to (f) are pyrazole ring represented by the formula (a) and isothiazole ring represented by the formula (b), most preferably pyrazole ring represented by the formula (a).

In the formula (1), $B^1$ and $B^2$ each represents =CR$^1$— and —CR$^2$= or one of $B^1$ and $B^2$ represents a nitrogen atom while the other represents =CR$^1$— or —CR$^2$=, but $B^1$ and $B^2$ preferably each represent =CR$^1$— or —CR$^2$=.

$R^5$ and $R^6$ each independently represents a hydrogen atom or a substituent which is an aliphatic group, aromatic group, heterocyclic ring, acyl group, alkoxycarbonyl group, aryloxycarbonyl group, carbamoyl group, alkylsulfonyl group, arylsulfonyl group or sulfamoyl group, the hydrogen atom of the substituent may be substituted.

Preferred examples of $R^5$ and $R^6$ may include hydrogen atom, aliphatic group, aromatic group, heterocyclic group, acyl group, alkylsulfonyl group or arylsulfonyl group. More preferably, $R^5$ and $R^6$ each are a hydrogen atom, aromatic group, acyl group, alkylsulfonyl group or arylsulfonyl group. Most preferably, $R^5$ and $R^6$ each are a hydrogen atom, aryl group or heterocyclic group. The hydrogen atom of the aforementioned various substituents may be substituted. However, $R^5$ and $R^6$ are not a hydrogen atom at the same time.

G, $R^1$ and $R^2$ each independently represents a hydrogen atom or a substituent which is a halogen atom, aliphatic group, aromatic group, heterocyclic ring, cyano group, carboxyl group, carbamoyl group, alkoxycarbonyl group, aryloxycarbonyl group, heterocyclic oxycarbonyl group, acyl group, hydroxy group, alkoxy group, aryloxy group, heterocyclic oxy group, silyloxy group, acyloxy group, carbamoyloxy group, alkoxycarbonyloxy group, aryloxycarbonyloxy group, amino group, acylamino group, ureido group, sulfamoylamino group, alkoxycarbonylamino group, aryloxycarbonylamino group, alkylsulfonylamino group, arylsulfonylamino group, heterocyclic sulfonylamino group, nitro group, alkylthio group, arylthio group, heterocyclic thio group, alkylsulfonyl group, arylsulfonyl group, heterocyclic sulfonyl group, alkylsulfinyl group, arylsulfinyl group, heterocyclic sulfinyl group, sulfamoyl group or sulfo group, the hydrogen atom of the substituent may be substituted.

G is preferably a hydrogen atom, halogen atom, aliphatic group, aromatic group, hydroxy group, alkoxy group, aryloxy group, acyloxy group, heterocyclic oxy group, amino group, acylamino group, ureido group, sulfamoylamino group, alkoxycarbonylamino group, aryloxycarbonylamino group, alkylthio group, arylthio group or heterocyclic thio group, more preferably a hydrogen atom, halogen atom, alkyl group, hydroxy group, alkoxy group, aryloxy group, acyloxy group, amino group or acylamino group, most preferably a hydrogen atom, amino group (preferably anilino group) or acylamino group. The hydrogen atom of the aforesaid substituents may be substituted.

Preferred examples of $R^1$ and $R^2$ include hydrogen atom, alkyl group, halogen atom, alkoxycarbonyl group, carboxyl group, carbamoyl group, hydroxy group, alkoxy group, and cyano group. The hydrogen atom of the aforesaid substituents may be substituted.

$R^1$ and $R^5$ or $R^5$ and $R^6$ may be connected to each other to form a 5- or 6-membered ring.

Examples of the substituents which may substitute on A or which may substitute on the substituents of $R^1$, $R^2$, $R^5$, $R^6$ or G include those listed above with reference to G, $R^1$ and $R^2$.

In the case where the dye of the present invention is a water-soluble dye, an ionic hydrophilic group is further provided on any position on A, $R^1$, $R^2$, $R^5$, $R^6$ and G as a substituent. Examples of the ionic hydrophilic group as a substituent include sulfo group, carboxyl group, phosphono group, quaternary ammonium group, etc. The aforesaid ionic hydrophilic group is preferably a carboxyl group, phosphono group and sulfo group, particularly carboxyl group or sulfo group. The carboxyl group, phosphono group and sulfo group may be in the form of salt, and examples of counter ions constituting the salt include ammonium ion, alkaline metal ion (e.g., lithium ion, sodium ion, potassium ion), and organic cation (e.g., tetramethylammonium ion, tetramethylguanidium ion, tetramethyl phosphonium).

The terms (substituent) as used in the specification will be described. These terms are common even to different signs in the formula (1) and the formula (1a) described later.

Examples of the halogen atom include fluorine atom, chlorine atom, and bromine atom.

The aliphatic group means alkyl group, substituted alkyl group, alkenyl group, substituted alkenyl group, alkinyl group, substituted alkinyl group, aralkyl group and substituted aralkyl group. In the specification, the term "substituted" as used in "substituted alkyl group", etc. means that the hydrogen atom in "alkyl group", etc. is substituted by substituents listed above with reference to G, $R^1$ and $R^2$, etc.

The aliphatic group may have branches or may form a ring. The number of carbon atoms in the aliphatic group is preferably from 1 to 20, more preferably from 1 to 16. The aryl moiety of the aralkyl group and substituted aralkyl group is preferably a phenyl group or naphthyl group, particularly phenyl group. Examples of the aliphatic group include methyl group, ethyl group, butyl group, isopropyl group, t-butyl group, hydroxyethyl group, methoxyethyl group, cyanoethyl group, trifluoromethyl group, 3-sulfopropyl group, 4-sulfobutyl group, cyclohexyl group, benzyl group, 2-phenethyl group, vinyl group, and allyl group.

The aromatic group means an aryl group and substituted aryl group. The aryl group is preferably a phenyl group or naphthyl group, particularly phenyl group. The number of carbon atoms in the aromatic group is preferably from 6 to 20, more preferably from 6 to 16.

Examples of the aromatic group include phenyl group, p-tollyl group, p-methoxyphenyl group, o-chlorophenyl group, and m-(3-sulfopropylamino)phenyl group.

Examples of the heterocyclic group include substituted heterocyclic groups. The heterocyclic group may have its heterocyclic ring condensed with aliphatic rings, aromatic rings or other heterocyclic rings. The aforesaid heterocyclic group is preferably a 5- or 6-membered heterocyclic ring. Examples of the aforesaid substituents include aliphatic group, halogen atom, alkylsulfonyl group, arylsulfonyl group, acyl group, acylamino group, sulfamoyl group, carbamoyl group, ionic hydrophilic group, etc. Examples of the aforesaid heterocyclic group include 2-pyridyl group, 2-chenyl group, 2-thiazolyl group, 2-benzothiazolyl group, 2-benzooxazolyl group, and 2-furyl group.

Examples of the carbamoyl group include substituted carbamoyl groups. Examples of the aforesaid substituents include alkyl group. Examples of the aforesaid carbamoyl group include methylcarbamoyl group, and dimethylcarbamoyl group.

Examples of the alkoxycarbonyl group include substituted alkoxycarbonyl groups. The aforesaid alkoxycarbonyl group is preferably an alkoxycarbonyl group having from 2 to 20 carbon atoms. Examples of the aforesaid substituents include ionic hydrophilic groups. Examples of the aforesaid alkoxycarbonyl group include methoxycarbonyl group, and ethoxycarbonyl group.

Examples of the aryloxycarbonyl group include substituted aryloxycarbonyl groups. The aforesaid aryloxycarbonyl group is preferably an aryloxycarbonyl group having from 7 to 20 carbon atoms. Examples of the aforesaid substituents include ionic hydrophilic groups. Examples of the aforesaid aryloxycarbonyl group include phenoxycarbonyl group.

Examples of the heterocyclic oxycarbonyl group include substituted heterocyclic oxycarbonyl groups. Examples of the heterocyclic ring include those listed above with reference to the heterocyclic group. The aforesaid heterocyclic oxycarbonyl group is preferably a heterocyclic oxycarbonyl group having from 2 to 20 carbon atoms. Examples of the aforesaid substituents include ionic hydrophilic groups. Examples of the aforesaid heterocyclic oxycarbonyl group include 2-pyridyloxycarbonyl group.

Examples of the acyl group include substituted acyl groups. The aforesaid acyl group is preferably an acyl group having from 1 to 20 carbon atoms. Examples of the aforesaid substituents include ionic hydrophilic groups. Examples of the aforesaid acyl group include acetyl group and benzoyl group.

Examples of the alkoxy group include substituted alkoxy groups. Examples of the aforesaid alkoxy group is preferably an alkoxy group having from 1 to 20 carbon atoms. Examples of the aforesaid substituents include alkoxy groups, hydroxyl groups, and ionic hydrophilic groups. Examples of the aforesaid alkoxy group include methoxy group, ethoxy group, isopropoxy group, methoxyethoxy group, hydroxyethoxy group, and 3-carboxypropoxy group.

Examples of the aryloxy group include substituted aryloxy groups. The aforesaid aryloxy group is preferably an aryloxy group having from 6 to 20 carbon atoms. Examples of the aforesaid substituents include alkoxy groups, and ionic hydrophilic groups. Examples of the aforesaid aryloxy group include phenoxy group, p-methoxyphenoxy group, and o-methoxyphenoxy group.

Examples of the heterocyclic oxy group include substituted heterocyclic oxy groups. Examples of the heterocyclic ring include those listed above with reference to the heterocyclic group. The aforesaid heterocyclic oxy group is preferably a heterocyclic oxy group having from 2 to 20 carbon atoms. Examples of the aforesaid substituents include alkyl groups, alkoxy group, and ionic hydrophilic groups. Examples of the aforesaid heterocyclic oxy group include 3-pyridyloxy group, and 3-chenyloxy group.

The silyloxy group is preferably a silyloxy group substituted by an aliphatic or aromatic group having from 1 to 20 carbon atoms. Examples of the aforesaid silyloxy group include trimethylsilyloxy, and diphenylmethylsilyloxy.

Examples of the acyloxy group include substituted acyloxy groups. The aforesaid acyloxy group is preferably an acyloxy group having from 1 to 20 carbon atoms. Examples of the aforesaid substituents include ionic hydrophilic groups. Examples of the aforesaid acyloxy group include acetoxy group, and benzoyloxy group.

Examples of the carbamoyloxy group include substituted carbamoyloxy groups. Examples of the aforesaid substituents include alkyl groups. Examples of the aforesaid carbamoyloxy group include N-methylcarbamoyloxy group.

Examples of the alkoxycarbonyloxy group include substituted alkoxycarbonyloxy groups. The aforesaid alkoxycarbonyloxy group is preferably an alkoxycarbonyloxy group having from 2 to 20 carbon atoms. Examples of the aforesaid alkoxycarbonyloxy group include methoxycarbonyloxy group, and isopropoxycarbonyloxy group.

Examples of the aryloxycarbonyloxy group include substituted aryloxycarbonyloxy groups. The aforesaid aryloxycarbonyloxy group is preferably an aryloxycarbonyloxy group having from 7 to 20 carbon atoms. Examples of the aforesaid aryloxycarbonyloxy group include phenoxycarbonyloxy group.

Examples of the amino group include substituted amino groups. Examples of said substituents include alkyl groups, aryl groups, or heterocylic groups, and the alkyl groups, aryl groups and heterocyclic groups may further have substituents. Examples of the alkylamino group include substituted alkylamino groups. The alkylamino group is preferably an alkylamino group having from 1 to 20 carbon atoms. Examples of the aforesaid substituents include ionic hydrophilic groups. Examples of the aforesaid alkylamino group include methylamino group, and diethylamino group.

Examples of the arylamino group include substituted arylamino groups. The aforesaid arylamino group is preferably an arylamino group having from 6 to 20 carbon atoms. Examples of the aforesaid substituents include halogen atoms, and ionic hydrophilic groups. Examples of the aforesaid arylamino group include phenylamino group, and 2-chlorophenylamino group.

Examples of the heterocyclic amino group include substituted heterocyclic amino groups. Examples of the heterocyclic ring include those listed above with reference to the heterocyclic group. The aforesaid heterocyclic amino group is preferably a heterocyclic amino group having from 2 to 20 carbon atoms. Examples of the aforesaid substituents include alkyl groups, halogen atoms, and ionic hydrophilic groups.

Examples of the acylamino group include substituted acrylamino groups. The aforesaid acylamino group is preferably an acylamino group having from 2 to 20 carbon atoms. Examples of the aforesaid substituents include ionic hydrophilic groups. Examples of the aforesaid acylamino group include acetylamino group, propionylamino group, benzoylamino group, N-phenylacetylamino group, and 3,5-disulfobenzoylamino group.

Examples of the ureido group include substituted ureido groups. The aforesaid ureido group is preferably an ureido group having from 1 to 20 carbon atoms. Examples of the aforesaid substituents include alkyl groups, and aryl groups. Examples of the aforesaid ureido group include 3-methylureido group, 3,3-dimethylureido group, and 3-phenylureido group.

Examples of the sulfamoylamino group include substituted sulfamoylamino groups. Examples of the aforesaid substituents include alkyl groups. Examples of the aforesaid sulfamoylamino group include N,N-dipropylsulfamoylamino group.

Examples of the alkoxycarbonylamino group include substituted alkoxycarbonylamino groups. The aforesaid alkoxycarbonylamino group is preferably an alkoxycarbonylamino group having from 2 to 20 carbon atoms. Examples of the aforesaid substituents include ionic hydrophilic groups. Examples of the aforesaid alkoxycarbonylamino group include ethoxycarbonylamino groups.

Examples of the aryloxycarbonylamino group include substituted aryloxycarbonylamino groups. The aforesaid aryloxycarbonylamino group is preferably an aryloxycarbonylamino group having from 7 to 20 carbon atoms. Examples of the aforesaid substituents include ionic hydrophilic groups. Examples of the aforesaid aryloxycarbonylamino group include phenoxycarbonylamino groups.

Examples of the alkylsulfonylamino group and arylsulfonylamino group include substituted alkylsulfonylamino groups and substituted arylsulfonylamino groups. The aforesaid alkylsulfonylamino group and arylsulfonylamino group are preferably an alkylsulfonylamino group and arylsulfonylamino group each having from 1 to 20 carbon atoms. Examples of the substituents include ionic hydrophilic groups. Examples of the aforesaid alkylsulfonylamino group and arylsulfonylamino group include methylsulfonylamino group, N-phenyl-methylsulfonylamino group, phenylsulfonylamino group, and 3-carboxyphenylsulfonylamino group.

Examples of the heterocyclic sulfonylamino group include substituted heterocyclic sulfonylamino groups. Examples of the heterocyclic ring include those listed above with reference to the heterocyclic group. The aforesaid heterocyclic sulfonylamino group is preferably a heterocyclic sulfonylamino group having from 1 to 12 carbon atoms. Examples of the aforesaid substituents include ionic hydrophilic groups. Examples of the aforesaid heterocyclic sulfonylamino group include 2-chenylsulfonylamino group, and 3-pyridylsulfonylamino group.

Examples of the alkylthio group, arylthio group and heterocyclic thio group include substituted alkylthio group, substituted arylthio group, and substituted heterocyclic thio group. Examples of the heterocyclic ring include those listed above with reference to the heterocyclic group. The aforesaid alkylthio group, arylthio group and heterocyclic thio group each preferably have from 1 to 20 carbon atoms. Examples of the aforesaid substituents include ionic hydrophilic groups. Examples of the aforesaid alkylthio group, arylthio group and heterocyclic thio group include methylthio group, phenylthio group, and 2-pyridylthio group.

Examples of the alkylsulfonyl group and arylsulfonyl group include substituted alkylsulfonyl groups and substituted arylsulfonyl groups. Examples of the alkylsulfonyl group and arylsulfonyl group include methylsulfonyl group and phenylsulfonyl group, respectively.

Examples of the heterocyclic sulfonyl group include substituted heterocyclic sulfonyl groups. Examples of the heterocyclic ring include those listed above with reference to the heterocyclic group. The aforesaid heterocyclic sulfonyl group is preferably a heterocyclic sulfonyl group having from 1 to 20 carbon atoms. Examples of the aforesaid substituents include ionic hydrophilic groups. Examples of the aforesaid heterocyclic sulfonyl group include 2-chenylsulfonyl group and 3-pyridylsulfonyl group.

Examples of the alkylsulfinyl group and arylsulfinyl group include substituted alkylsulfinyl groups and substituted arylsulfinyl groups. Examples of the alkylsulfinyl group and arylsulfinyl group include methylsulfinyl group and phenylsulfinyl group, respectively.

Examples of the heterocyclic sulfinyl group include substituted heterocyclic sulfinyl groups. Examples of the heterocyclic ring include those listed above with reference to the heterocyclic group. The aforesaid heterocyclic sulfinyl group is preferably a heterocyclic sulfinyl group having from 1 to 20 carbon atoms. Examples of the aforesaid substituents include ionic hydrophilic groups. Examples of the heterocyclic sulfinyl group include 4-pyridylsulfinyl group.

Examples of the sulfamoyl group include substituted sulfamoyl groups. Examples of the aforesaid substituents include alkyl groups. Examples of the aforesaid sulfamoyl group include dimethylsulfamoyl group, and di-(2-hydroxyethyl)sulfamoyl group.

Particularly preferred among the structures of the formula (1) is one represented by the following formula (1a).

Formula (1a)

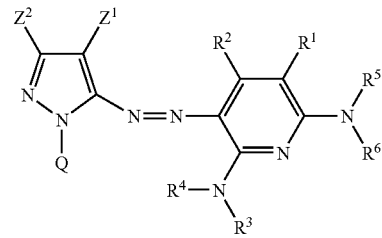

wherein $R^1$, $R^2$, $R^5$ and $R^6$ are as defined in the formula (1).

$R^3$ and $R^4$ each independently represents a hydrogen atom or a substituent which represents an aliphatic group, aromatic group, heterocyclic group, acyl group, alkoxycarbonyl group, aryloxycarbonyl group, carbamoyl group, alkylsulfonyl group, arylsulfonyl group or sulfamoyl group. Preferred among these substituents is hydrogen atom, aromatic group, heterocyclic group, acyl group, alkylsulfonyl group or arylsulfonyl group, particularly hydrogen atom, aromatic group and heterocyclic group.

$Z^1$ represents an electron-withdrawing group having a Hammett's substituent constant σp value of 0.20 or more. $Z^1$ is preferably an electron-withdrawing group having σp value of 0.30 or more, more preferably 0.45 or more, particularly 0.60 or more, but is preferably not greater than 1.0. Specific preferred examples of the substituents include electron-withdrawing substituents described later, and preferred among these electron-withdrawing substituents are $C_2$–$C_{20}$ acyl group, $C_2$–$C_{20}$ alkyloxycarbonyl group, nitro group, cyano group, $C_1$–$C_{20}$ alkylsulfonyl group, $C_6$–$C_{20}$ arylsulfonyl group, $C_1$–$C_{20}$ carbamoyl group, and $C_1$–$C_{20}$ halogenated alkyl group. Particularly preferred among these electron-withdrawing substituents are cyano group, $C_1$–$C_{20}$ alkylsulfonyl group, and $C_6$–$C_{20}$ arylsulfonyl group, most preferably cyano group.

$Z^2$ represents a hydrogen atom or a substituent and the substituent represents an aliphatic group, aromatic group or heterocyclic group. $Z^2$ is preferably an aliphatic group, more preferably a $C_1$–$C_6$ alkyl group.

Q represents a hydrogen atom or a substituent and the substituent represents an aliphatic group, aromatic group or heterocyclic group. In particular, Q is preferably a group formed by a group of non-metallic atoms required to form a 5- to 8-membered ring. The aforementioned 5- to 8-membered ring may be substituted, may be a saturated ring or may have an unsaturated bond. Particularly preferred among these 5- to 8-membered rings are aromatic group and heterocyclic group. Preferred examples of the non-metallic atom include nitrogen atom, oxygen atom, sulfur atom, or carbon atom. Specific examples of these cyclic structures include benzene ring, cyclopentane ring, cyclohexane ring, cycloheptane ring, cyclooctane ring, cyclohexene ring, pyridine ring, pyrimidine ring, pyrazine ring, pyridazine ring, triazine ring, imidazole ring, benzoimidazole ring, oxazole ring, benzoxazole ring, thiazole ring, benzothiazole ring, oxane ring, sulfolane ring, and thiane ring, etc.

The hydrogen atoms in the substituents described with reference to the formula (1a) may be substituted. Examples of the substituents include substituents listed with reference to the formula (1), and groups and ionic hydrophilic groups exemplified with reference to G, $R^1$ and $R^2$.

The Hammett's substituent constant σp value as used herein will be further described hereinafter. Hammett's rule is an empirical rule which L. P. Hammett proposed in 1935 to quantitatively discuss the effect of substituents on the reaction or equilibrium of benzene derivatives, and the validity of this empirical rule has been widely accepted today. Substituent constants required in Hammett's rule are σp value and σm value, and these values are found in many general literatures, and for the details of these values, reference can be made to J. A. Dean, "Lange's Handbook of Chemistry", 12th ed., 1979 (McGraw-Hill), and "Kagaku no Ryoiki (Region of Chemistry)", extra edition, No. 122, pp. 96–103, 1979 (Nankodo). In the present invention, these substituents are defined or described by Hammett's substituent constant σp, but this doesn't mean that the known values found in the aforementioned literatures are not limited to certain substituents and it goes without saying that even if the values are unknown in literatures, they contain substituents which may fall within the defined range when measured according to Hammett's rule. Further, the compounds of the formula (1a) of the invention contain those which are not benzene derivatives, and as a measure for indicating the electron effect of substituents there is used σp value regardless of substitution position. In the present invention, σp value is used in this sense.

Examples of the electron-withdrawing group having a Hammett's substituent constant σp value of 0.60 or more include cyano group, nitro group, and alkylsulfonyl group (e.g., methylsulfonyl group, arylsulfonyl group (e.g., phenylsulfonyl group)).

Examples of the electron-withdrawing group having a Hammett's substituent constant σp value of 0.45 or more include acyl groups (e.g., acetyl group), alkoxycarbonyl groups (e.g., dodecyloxycarbonyl group), aryloxycarbonyl groups (e.g., m-chlorophenoxycarbonyl), alkylsulfinyl groups (e.g., n-propylsulfinyl), arylsulfinyl groups (e.g., phenylsulfinyl), sulfamoyl groups (e.g., N-ethylsulfamoyl, N,N-dimethylsulfamoyl), and halogenated alkyl groups (e.g., trifluoromethyl), in addition to the aforementioned groups.

Examples of the electron-withdrawing group having a Hammett's substituent constant σp value of 0.30 or more include acyloxy groups (e.g., acetoxy), carbamoyl groups (e.g., N-ethylcarbamoyl, N,N-dibutylcarbamoyl), halogenated alkoxy groups (e.g., trifluoromethyloxy), halogenated aryloxy groups (e.g., pentafluorophenyloxy), sulfonyloxy groups (e.g., methylsulfonyloxy group), halogenated alkylthio groups (e.g., difluoromethylthio), aryl groups substituted by two or more electron-withdrawing groups having a σp value of 0.15 or more (e.g., 2,4-dinitrophenyl, pentafluorophenyl), and heterocyclic groups (e.g., 2-benzooxazolyl, 2-benzothiazolyl, 1-phenyl-2-benzoimidazolyl), in addition to the aforementioned groups.

Specific examples of the electron-withdrawing group having a σp value of 0.20 or more include halogen atoms, in addition to the aforementioned groups.

Referring to a particularly preferred combination of the substituents as azo dyes represented by the formula (1), $R^5$ and $R^6$ each are preferably a hydrogen atom, alkyl group, aryl group, heterocyclic group, sulfonyl group or acyl group, more preferably hydrogen atom, aryl group, heterocyclic group or sulfonyl group, most preferably hydrogen atom, aryl group or heterocyclic group. However, $R^5$ and $R^6$ are not a hydrogen atom at the same time.

G is preferably a hydrogen atom, halogen atom, alkyl group, hydroxyl group, amino group or acylamino group, more preferably hydrogen atom, halogen atom, amino group or acylamino group, most preferably hydrogen atom, amino group or acylamino group.

A is preferably a pyrazole ring, imidazole ring, isothiazole ring, thiadiazole ring or benzothiazole ring, more preferably pyrazole ring or isothiazole ring, most preferably pyrazole ring.

$B^1$ and $B^2$ are $=CR^1-$ and $-CR^2=$, respectively, in which $R^1$ and $R^2$ each are preferably a hydrogen atom, alkyl group, halogen atom, cyano group, carbamoyl group, carboxyl group, hydroxyl group, alkoxy group or alkoxycarbonyl group, more preferably hydrogen atom, alkyl group, carboxyl group, cyano group or carbamoyl group.

Referring to a preferred combination of substituents on the compound represented by the formula (1), at least one of the various substituents is preferably a compound which is a preferred group as mentioned above, and more preferably, more of the various substituents are compounds which are preferred groups as mentioned above, and most preferably, all the various substituents are compounds which are preferred groups as mentioned above.

Specific examples of the azo dye represented by the formula (1) will be given below (Table 1) to (Table 13), but the azo dye to be used in the present invention is not limited to the following examples.

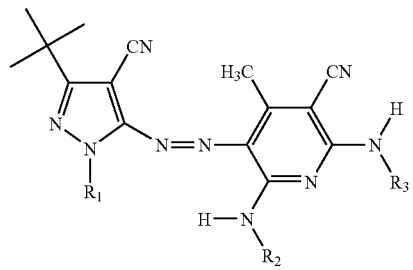

| dye | $R_1$ | $R_2$ | $R_3$ |
|---|---|---|---|
| a-1 | (2-benzothiazolyl) | —⟨phenyl⟩—$C_8H_{17}$ | —⟨phenyl⟩—$C_8H_{17}$ |

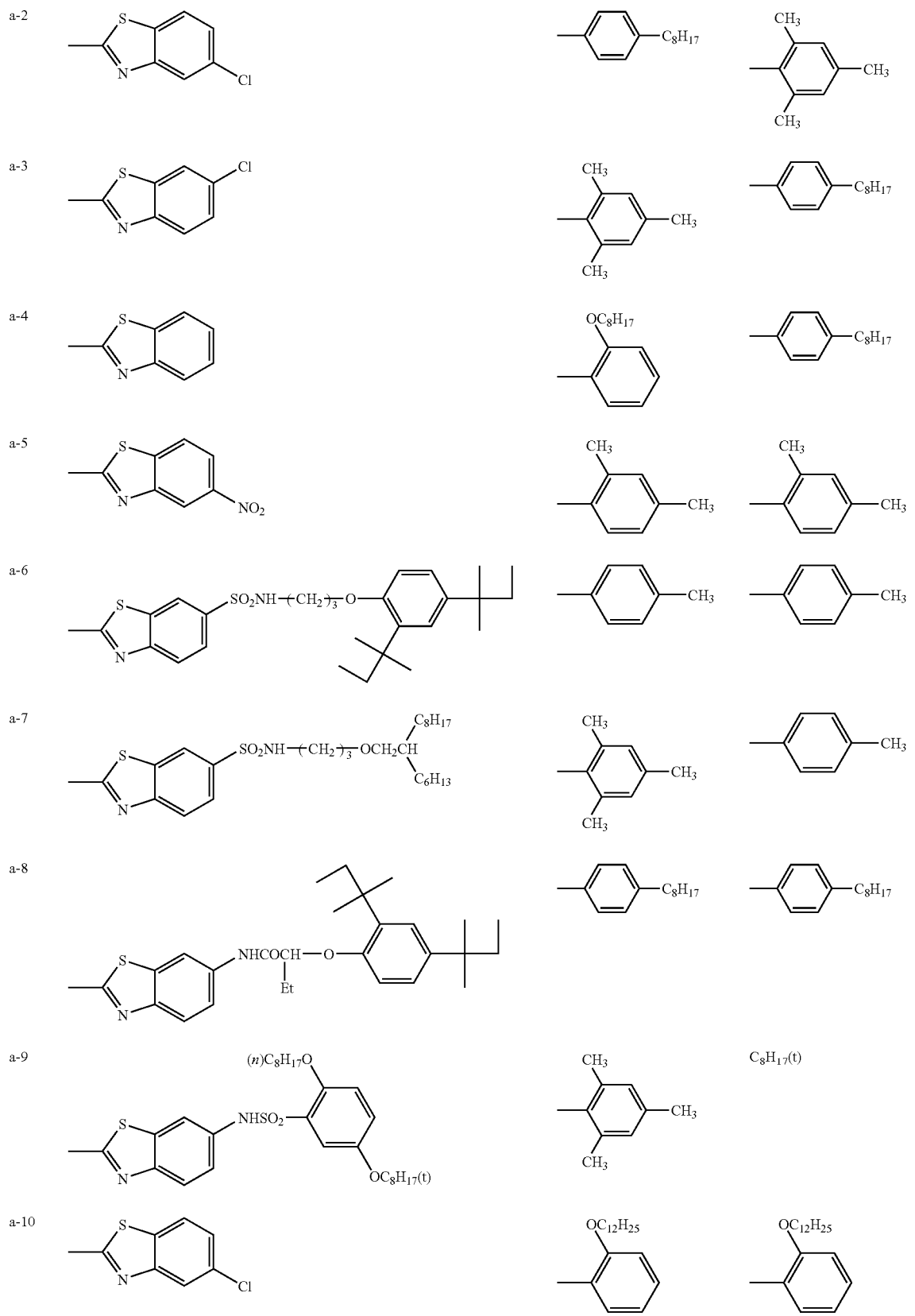

-continued
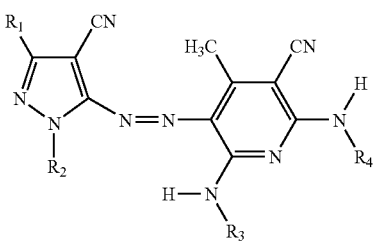
| dye | $R_1$ | $R_2$ | $R_3$ | $R_4$ |
|---|---|---|---|---|
| a-11 |  | 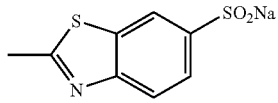 | 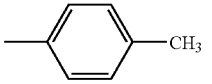 | 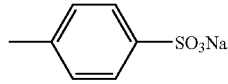 |
| a-12 | 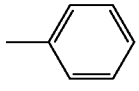 | 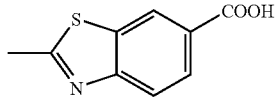 | 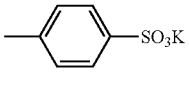 | 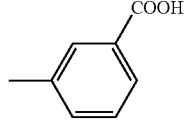 |
| a-13 | 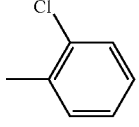 | 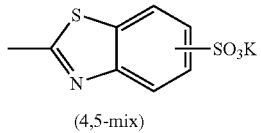 (4,5-mix) | 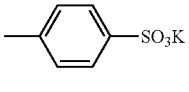 | 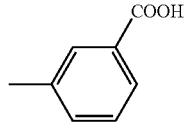 |
| a-14 |  | 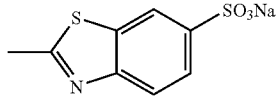 | 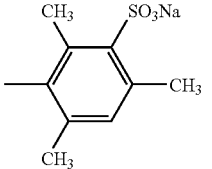 | 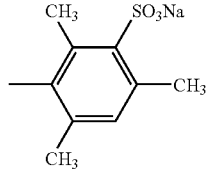 |
| a-15 |  | 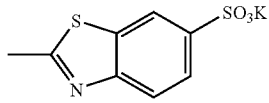 | 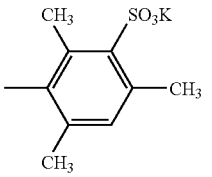 | 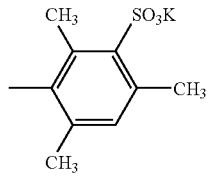 |
| a-16 |  | 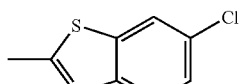 | 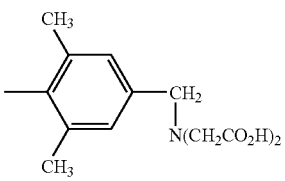 | 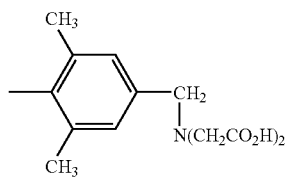 |
| a-17 |  | 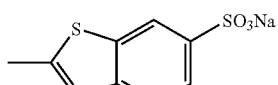 | 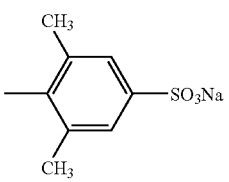 | 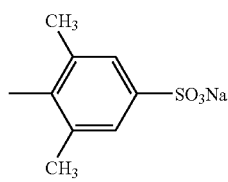 |

-continued

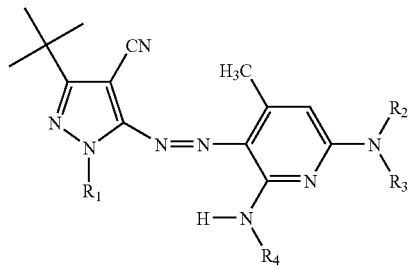

| 染料 | R₁ | R₂ | R₃ | R₄ |
|---|---|---|---|---|
| a-18 | 2-benzothiazolyl | 2-benzothiazolyl | 2,4,6-trimethylphenyl | 2,4,6-trimethylphenyl |
| a-19 | 5-chloro-2-benzothiazolyl | —SO₂CH₃ | 2,4,6-trimethylphenyl | 4-methylphenyl |
| a-20 | 2-benzothiazolyl | —COCH₃ | C₈H₁₇(t) | C₈H₁₇(t) |
| a-21 | 6-chloro-2-benzothiazolyl | —SO₂CH₃ | 2,4-dimethylphenyl | C₈H₁₇(t) |
| a-22 | 2-benzothiazolyl | H | 2,4,6-trimethylphenyl | 2,4,6-trimethylphenyl |
| a-23 | 2-benzothiazolyl | H | 2,3-dimethylphenyl | 2-methylphenyl |
| a-24 | 2-benzothiazolyl | H | 2,3-dimethylphenyl | 2,3-dimethylphenyl |
| a-25 | 2-benzoxazolyl | 2-benzoxazolyl | 2,4,6-trimethylphenyl | 2,4,6-trimethylphenyl |

The ink for ink jet recording of the present invention (also referred to as "ink of the present invention") comprises at least one of the aforesaid azo dyes dissolved or dispersed in an aqueous medium in an amount of preferably from 0.2 to 20% by weight, more preferably from 0.5 to 15% by weight. Further, the solubility (or dispersibility in stable state) of the azo dye in water at 20° C. is preferably 5% by weight or more, more preferably 10% by weight or more.

The magenta dye having the aforesaid azo group to be used in the present invention has a dye oxidation potential of more positive than 1.0 V vs SCE, preferably more positive than 1.1 V vs SCE, particularly preferably more positive than 1.2 V in an ink aqueous medium. As a means of enhancing the potential there may be used a method involving the selection from the aforesaid preferred structural requirements, i.e., selection of dye structure of the type having a chromophore represented by (heterocyclic ring A)—N=N— (heterocyclic ring B), a method involving the selection of an azo dye comprising an azo group having an aromatic nitrogen-containing 6-membered heterocyclic ring directly connected to at least one end thereof as a coupling component, a method involving the selection of an azo dye having an aromatic cyclic amino group or a heterocyclic amino group-containing structure as an auxochrome or a method involving the α-dehydrogenation of an azo dye. In particular, the dye of the aforesaid formula (1) has a positive potential. In some detail, it is described in Japanese Patent Application 2001-254878.

Examples of the method of measuring the oxidation potential employable herein include various measuring methods using SCE (standard saturated calomel electrode) as a reference electrode in an aqueous solution or water-mixed solvent system having a dye dissolved therein such as DC polarography using a graphite electrode or platinum electrode as a work electrode, polarography using a dropping mercury electrode, cyclic voltammetry (CV), rotary ring disc electrode method and comb-shaped electrode method, etc. Using the aforesaid measuring method, the oxidation potential is measured as a value relative to SCE (standard saturated calomel electrode) in a solvent such as dimethylformamide and acetonitrile containing a supporting electrolyte such as sodium perchlorate and tetrpropylammonium perchlorate having a test specimen dissolved therein in an amount of from $1 \times 10^{-4}$ to $1 \times 10^{-6}$ mol·dm$^{-3}$. Further, as the supporting electrolyte and solvent to be used there may be properly selected depending on the oxidation potential or solubility of the test specimen. The supporting electrolytes and solvents which can be used are described in Akira Fujishima et al, "Electrochemical Measurement Methods", Gihodo, 1984, pp. 101–118.

The value of oxidation potential may deviate by scores of millivolts due to the effect of potential difference between solutions, liquid resistance of sample solution, etc., but by correcting it using a standard sample (e.g., hydroquinone), the reproducibility of the value of potential thus measured can be assured and the same measurements can be obtained using any of the aforesaid potential measuring methods.

Another criterion for oxidation resistance of the azo dye having an oxidation potential of more positive than 1.0 V vs SCE is accelerated fading rate constant with respect to ozone gas, and the preferred azo dye has an accelerated fading rate constant of $5.0 \times 10^{-2}$ [hr$^{-1}$] or less, preferably $3.0 \times 10^{-2}$ [hr$^{-1}$] or less, more preferably $1.5 \times 10^{-2}$ [hr$^{-1}$] or less.

For the measurement of accelerated fading rate constant with respect to ozone gas, the colored region on an image obtained by printing only the ink on a reflection image-receiving medium where the color of the main spectral absorption range of the ink is exhibited and the reflection density measured through a status A filter is from 0.90 to 1.10 is selected as initial density point and this initial density is defined as staring density (=100%). This image is caused to fade using an ozone fading tester in which the ozone concentration is always kept at 5 mg/L, the time required until the image density reaches 80% of the initial density is measured, and the reciprocal [hour$^{-1}$] of the time thus measured is then determined and defined as fading reaction rate constant on the assumption that the relationship between the fading density and the time follows primary reaction rate equation. Accordingly, the fading rate constant thus determined is the fading rate constant of the colored region printed with the ink, but this value is used as fading rate constant of ink in the specification.

As a testing print patch there may be used a patch having a black rectangular mark according to JIS code 2223 printed thereon, a gradient color patch of Macbeth chart or an arbitrary gradient density patch capable of giving measured area.

The reflection density of reflected image (gradient color patch) printed for measurement is the density determined with measuring light passing through a status A filter by a densitometer that meets international specification ISO5-4 (geometric conditions of reflection density).

The testing chamber for the measurement of accelerated fading rate constant with respect to ozone gas is provided with an ozone generator (e.g., high voltage discharge type which operates by applying AC voltage to dried air) capable of always keeping the interior ozone gas concentration to 5 mg/L, and the aeration temperature is adjusted to 25° C.

This accelerated fading rate constant is an indication of the ease of oxidation by an oxidizing atmosphere in the environment such as photochemical smog, automobile emission, organic vapor from coated surface of furniture, carpet, etc. and gas generated from the interior of a frame in daylight room, etc., and ozone gas represents these oxidizing atmospheres.

Next, the hue of magenta ink will be described. The magenta ink preferably has λmax of from 500 to 580 nm from the standpoint of hue and has a small half-width on both the long and short wavelength sides of the maximum absorption wave length, i.e., sharp absorption spectrum. This is described in detail in JP-A-2002-309133. Further, by introducing methyl group at α-position, the sharpening of absorption can be realized.

The magenta ink of the present invention may comprise other dyes incorporated therein besides the aforesaid specific azo dyes according to the present invention for the purpose of adjusting color tone or like purposes. Further, in order to form a full-color ink set, the magenta ink of the present invention is used in combination with a cyan ink, a yellow ink and a black ink, and these dyes comprise respective dyestuffs. Examples of these dyes which can be used in combination with the magenta ink will be given below.

Examples of yellow dyestuffs include aryl or heterylazo dyestuffs having phenols, naphthols, anilines, pyrazolones, pyridones or closed-chain type active methylene compounds as coupling components, azomethine dyestuffs having closed-chain type active methylene compounds as coupling components, methine dyestuffs such as benzylidene dyestuff and monomethine oxonol dyestuff, and quinone-based dyestuffs such as naphthoquinone dyestuff and anthraquinone dyestuff. Other examples of yellow dyestuffs include quinophthalone dyestuff, nitro-nitroso dyestuff, acridine dyestuff, and acridinone dyestuff. These dyestuffs may assumes yellow only when chromophore is partly dissociated, and, in this case, the counter cation may be an inorganic cation such as of alkaline metal and ammonium or an organic cation such as of pyridinium and quaternary ammonium salt or may be contained in a polymer cation as a partial structure.

Examples of magenta dyestuffs include aryl or heterylazo dyestuffs having phenols, naphthols or anilines as coupling components, azomethine dyestuffs having pyrazolones or pyrazolotriazoles as coupling components, methine dyestuffs such as arylidene dyestuff, styryl dyestuff, melocyanine dyestuff and oxonol dyestuff, carbonium dyestuffs such as diphenylmethane dyestuff, triphenylmethane dyestuff and xanthene dyestuff, quinone-based dyestuffs such as naphthoquinone, anthraquinone and anthrapyridone, and condensed polycyclic dyestuffs such as dioxazine dyestuff. These dyestuffs may assumes magenta only when chromophore is partly dissociated, and, in this case, the counter cation may be an inorganic cation such as alkaline metal and ammonium or an organic cation such as pyridinium and quaternary ammonium salt or may be contained in a polymer cation as a partial structure.

Examples of cyan dyestuff include azomethine dyestuffs such as indoaniline dyestuff and indophenol dyestuff, polymethine dyestuffs such as cyanine dyestuff, oxonol dyestuff and melocyanine dyestuff, carbonium dyestuffs such as diphenylmethane dyestuff, triphenylmethane dyestuff and xanthene dyestuff, phthalocyanine dyestuffs, anthraquinone dyestuffs, aryl or heterylazo dyestuffs having phenols, naphthols or anilines as coupling components, and indigo-thioindigo dyestuffs. These dyestuffs may assumes cyan only when chromophore is partly dissociated, and, in this case, the counter cation may be an inorganic cation such as of alkaline metal and ammonium or an organic cation such as of pyridinium and quaternary ammonium salt or may be contained in a polymer cation as a partial structure.

Alternatively, a black dyestuff such as polyazo dyestuff may be used.

The dyestuff containing an azo dye to be used in the present invention is substantially water-soluble or water-dispersible. In some detail, the solubility or dispersibility of the dye in water at 20° C. is 2% by weight or more, preferably 5% by weight or more.

Examples of other water-soluble dyes include direct dyes, acidic dyes, food dyes, basic dyes, and reactive dyes, etc. Preferred examples of these water-soluble dyes include:

C.I. Direct Red 2, 4, 9, 23, 26, 31, 39, 62, 63, 72, 75, 76, 79, 80, 81, 83, 84, 89, 92, 95, 111, 173, 184, 207, 211, 212, 214, 218, 21, 223, 224, 225, 226, 227, 232, 233, 240, 241, 242, 243, 247;

C.I. Direct Violet 7, 9, 47, 48, 51, 66, 90, 93, 94, 95, 98, 100, 101;

C.I. Direct Yellow 8, 9, 11, 12, 27, 28, 29, 33, 35, 39, 41, 44, 50, 53, 58, 59, 68, 86, 87, 93, 95, 96, 98, 100, 106, 108, 109, 110, 130, 132, 142, 144, 161, 163;

C.I. Direct Blue 1, 10, 15, 22, 25, 55, 67, 68, 71, 76, 77, 78, 80, 84, 86, 87, 90, 98, 106, 108, 109, 151, 156, 158, 159, 160, 168, 189, 192, 193, 194, 199, 200, 201, 202, 203, 207, 211, 213, 214, 218, 225, 229, 236, 237, 244, 248, 249, 251, 252, 264, 270, 280, 288, 289, 291;

C.I. Direct Black 9, 17, 19, 22, 32, 51, 56, 62, 69, 77, 80, 91, 94, 97, 108, 112, 113, 114, 117, 118, 121, 122, 125, 132, 146, 154, 166, 168, 173, 199;

C.I. Acid Red 35, 42, 52, 57, 62, 80, 82, 111, 114, 118, 119, 127, 128, 131, 143, 151, 154, 158, 249, 254, 257, 261, 263, 266, 289, 299, 301, 305, 336, 337, 361, 396, 397;

C.I. Acid Violet 5, 34, 43, 47, 48, 90, 103, 126;

C.I. Acid yellow 17, 19, 23, 25, 39, 40, 42, 44, 49, 50, 61, 64, 76, 79, 110, 127, 135, 143, 151, 159, 169, 174, 190, 195, 196, 197, 199, 218, 219, 222, 227;

C.I. Acid Blue 9, 25, 40, 41, 62, 72, 76, 78, 80, 82, 92, 106, 112, 113, 120, 127: 1, 129, 138, 143, 175, 181, 205, 207, 220, 221, 230, 232, 247, 258, 260, 264, 271, 277, 278, 279, 280, 288, 290, 326;

C.I. Acid Black 7, 24, 29, 48, 52: 1, 172;

C.I. Reactive Red 3, 13, 17, 19, 21, 22, 23, 24, 29, 35, 37, 40, 41, 43, 45, 49, 55;

C.I. Reactive Violet 1, 3, 4, 5, 6, 7, 8, 9, 16, 17, 22, 23, 24, 26, 27, 33, 34;

C.I. Reactive Yellow 2, 3, 13, 14, 15, 17, 18, 23, 24, 25, 26, 27, 29, 35, 37, 41, 42;

C.I. Reactive Blue 2, 3, 5, 8, 10, 13, 14, 15, 17, 18, 19, 21, 25, 26, 27, 28, 29, 38;

C.I. Reactive Black 4, 5, 8, 14, 21, 23, 26, 31, 32, 34;

C.I. Basic Red 12, 13, 14, 15, 18, 22, 23, 24, 25, 27, 29, 35, 36, 38, 39, 45, 46;

C.I. Basic Violet 1, 2, 3, 7, 10, 15, 16, 20, 21, 25, 27, 28, 35, 37, 39, 40, 48;

C.I. Basic Yellow 1, 2, 4, 11, 13, 14, 15, 19, 21, 23, 24, 25, 28, 29, 32, 36, 39, 40;

C.I. Basic Blue 1, 3, 5, 7, 9, 22, 26, 41, 45, 46, 47, 54, 57, 60, 62, 65, 66, 69, 71;

C.I. Basic Black 8, etc.

Further, the magenta ink of the present invention or other inks to be combined therewith to form an ink set may be used in combination with pigments.

As the pigments to be used in the present invention there may be used commercially available products as well as known compounds listed in various literatures. Examples of these literatures include Color Index (compiled by The Society of Dyers and Colourists), "Kaitei Shinban Ganryo Binran (Revised Edition of Handbook of Pigments)", compiled by Japan Association of Pigment Technology, 1989, "Saishin Ganryo Ouyou Gijutsu (Modern Applied Technology of Pigments)", CMC, 1986, "Insatsu Inki Gijutsu (Printing Ink Technology)", CMC, 1984, and W. Herbst, K. Hunger, "Industrial Organic Pigments", VCH Verlagsgesellschaft, 1993. Specific examples of these pigments include organic pigments such as azo pigment (e.g., azo lake pigment, insoluble azo pigment, condensed azo pigment, chelate azo pigment), polycyclic pigment (e.g., phthalocyanine pigment, anthraquinone-based pigment, perylene-based pigment, perynone-based pigment, indigo-based pigment, quinacridone-based pigment, dioxazine-based pigment, isoindolinone-based pigment, quinophthalone-based pigment, diketopypyrrolopyrrole-based pigment), dyed lake pigment (e.g., acidic or basic dye lake pigment) and azine pigment, etc., and inorganic pigments such as yellow pigment (e.g., C.I. Pigment Yellow 34, 37, 42, 53), red pigment (e.g., C.I. Pigment Red 101, 108), blue pigment (e.g., C.I. Pigment blue 27, 29, 17: 1), black pigment (e.g., C.I. Pigment Black 7, magnetite, etc.) and white pigment (e.g., C.I. Pigment White 4, 6, 18, 21, etc.).

As a pigment having a color tone suitable for image formation there is preferably used a blue or cyan pigment such as phthalocyanine pigment, anthraquinone-based indanthrone pigment (e.g., C.I. Pigment Blue 60, etc.) and dyed lake pigment-based triarylcarbonium pigment, particularly phthalocyanine pigment (Preferred examples of the phthalocyanine pigment include copper phthalocyanine such as C.I. Pigment Blue 15:1, 15:2, 15:3, 15:4 and 15:6, monochlorophthalocyanine, low chlorination copper phthalocyanine, aluminum phthalocyanine such as pigment listed in European Patent 860475, metal-free phthalocyanine such as C.I. Pigment Blue 16, and phthalocyanine having Zn, Ni or Ti as a central metal. Particularly most preferred among these phthalocyanine dyes are C.I. Pigment Blue 15:3, 15:4, and aluminum phthalocyanine).

Preferred examples of red or purple pigments include azo pigments (Preferred examples of these pigments include C.I. Pigment Red 3, 5, 11, 22, 38, 48:1, 48:2, 48:3, 48:4, 49:1, 52:1, 53:1, 57:1, 63:2, 144, 146, 184. Particularly preferred among these pigments are C.I. Pigment Red 57:1, 146, 184) quinacridone-based pigments (Preferred examples of these pigments include C.I. Pigment Red 122, 192, 202, 207, 209, and C.I. Pigment Violet 19, 42. Particularly preferred among these pigments is C.I. Pigment Red 122), dyed lake-based triarylcarbonium pigments (Preferred examples of these pigments include xanthene-based C.I. Pigment Red 81:1, C.I. Pigment Violet 1, 2, 3, 27, 39), dioxazine-based pigments (e.g., C.I. Pigment Violet 23, 37), diketopyrrolopyrrole-based pigments (e.g., C.I. Pigment Red 254), perylene pigments (e.g., C.I. Pigment Violet 29), anthraquinone-based pigments (e.g., C.I. Pigment Violet 5:1, 31, 33), and thioindigo-based pigments (e.g., C.I. Pigment Red 38, 88).

Preferred examples of yellow pigments include azo pigments (Preferred examples of these pigments include monoazo pigment-based ones such as C.I. Pigment Yellow 1, 3, 74, 98, disazo pigment-based ones such as C.I. Pigment Yellow 12, 13, 14, 16, 17, 83, general azo-based ones such as C.I. Pigment Yellow 93, 94, 95, 128, 155 and benzimidazolone-based ones such as C.I. Pigment Yellow 120, 151, 154, 156, 180. Particularly preferred among these pigments are those prepared from materials other than benzidine-based compounds), isoindoline-isoindolinone-based pigments (Preferred examples of these pigments include C.I. Pigment Yellow 109, 110, 137, 139), quinophthalone pigments (Preferred examples of these pigments include C.I. Pigment Yellow 138, etc.), and flavanthrone pigment (e.g., C.I. Pigment Yellow 24, etc.).

Preferred examples of black pigments include inorganic pigments (Preferred examples of these pigments include carbon black, and magnetite), and aniline black.

Besides these pigments, orange pigments (C.I. Pigment Orange 13, 16, etc.), and green pigments (C.I. Pigment Green 7, etc.) may be used.

The pigments which may be used in the present technique may be untreated pigments as mentioned above or may be surface-treated pigments. As surface treatment methods there may be proposed a method involving surface coat with a resin or wax, a method involving the attachment of a surface activator, a method involving the bonding of a reactive material (e.g., silane coupling agent, radical produced from an epoxy compound, polyisocyanate or diazonium salt) to the surface of pigment, etc., and these methods are described in the following literatures and patents.

(i) Kinzoku Sekken no Seishitsu to Ouyou (Properties and Application of Metal Soap) (Saiwai Shobo)

(ii) Insatsu Inki Insatsu (Printing with Printing Ink) (CMC Shuppan, 1984)

(iii) Saishin Ganryo Ouyou Gijutsu (Modern Applied Technology of Pigments (CMC, 1986)

(iv) U.S. Pat. Nos. 5,554,739, 5,571,311

(v) JP-A-9-151342, JP-A-10-140065, JP-A-10-292143, JP-A-11-166145

In particular, self-dispersible pigments prepared by reacting the diazonium salt disclosed in the US patents (iv) with carbon black and capsulized pigments prepared according to the method disclosed in the Japanese patents (v) are useful to obtain dispersion stability without using extra dispersant in the ink.

In the present invention, the pigment may be further dispersed with a dispersant. As such a dispersant there may be used any of known compounds depending on the pigment used, e.g., surface active agent type low molecular dispersant or polymer type dispersant. Examples of these dispersants include those disclosed in JP-A-3-69949 and European Patent 549,486. In order to accelerate the adsorption of the pigment to the dispersant used, a pigment derivative called synergist may be added.

The particle diameter of the pigment which may be used in the present technique is preferably from $0.01\mu$ to $10\mu$, more preferably from $0.05\mu$ to $1\mu$ after dispersion.

As a method for dispersing the pigment there may be used a known dispersion technique for use in the production of ink or toner. Examples of the dispersing machine include vertical or horizontal agitator mill, attritor, colloid mill, ball mill, three-roll mill, pearl mill, super mill, impeller, disperser, KD mill, dynatron, and pressure kneader, etc. The details of these dispersing machines are described in "Saishin Ganryo Ouyou Gijutsu (Modern Applied Technology of Pigments)", CMC, 1986.

The surface active agent which can be incorporated in the ink for ink jet recording of the present invention will be described hereinafter.

A surface active agent can be incorporated in the ink for ink jet recording of the present invention to adjust the liquid physical properties of the ink, making it possible to provide the ink with an enhanced ejection stability and hence excellent effects such as enhanced water resistance of image and prevention of bleeding of ink printed.

Examples of the surface active agent include anionic surface active agents such as sodium dodecylsulfate, sodium dodecyloxysulfonate and sodium alkylbenzenesulfonate, etc., cationic surface active agents such as cetyl pyridinium chloride, trimethyl cetyl ammonium chloride and tetrabutyl ammonium chloride, etc., and nonionic surface active agents such as polyoxyethylene nonyl phenyl ether, polyoxyethylene naphthyl ether and polyoxy ethylene octyl phenyl ether, etc. Particularly preferred among these surface active agents are nonionic surface active agents.

The content of the surface active agent is from 0.001% to 15% by weight, preferably from 0.005% to 10% by weight, more preferably from 0.01% to 5% by weight based on the amount of the ink.

In the present invention, the surface active agent is used also when the emulsion dispersion of coloring material described later is needed and when it is used as a surface tension adjustor and thus will be further described in the respective reference.

The ink for ink jet recording of the present invention can be prepared by dissolving and/or dispersing the aforementioned azo dye and surface active agent in an aqueous medium. The term "aqueous medium" as used in the present invention is meant to indicate water or a mixture of water and a small amount of a water-miscible organic solvent optionally comprising additives such as wetting agent, stabilizer and preservative incorporated therein.

Examples of the water-miscible organic solvent employable in the present invention include alcohols (e.g., methanol, ethanol, propanol, isopropanol, butanol, isobutanol, sec-butanol, t-butanol, pentanol, hexanol, cyclohexanol, benzyl alcohol), polyvalent alcohols (e.g., ethylene glycol, diethylene glycol, triethylene glycol, polyethylene glycol, propylene glycol, dipropylene glycol, polypropylene glycol, butylene glycol, hexanediol, pentanediol, glycerin, hexanetriol, thiodiglycol), glycol derivatives (e.g., ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether, ethylene glycol monophenyl ether), amines (e.g., ethanolamine, diethanolamine, triethanolamine, N-methyldiethanolamine, N-ethyldiethanolamine, morpholine, N-ethylmorpholine, ethylene diamine, diethylene triamine, triethylene tetramine, polyethyleneimine, tetramethylpropylenediamine), and other polar solvents (e.g., formamide, N,N-dimethylformamide, N,N-dimethylacetamide, dimethylsulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile, acetone). Two or more of the water-miscible organic solvents may be used in combination.

The aforementioned azo dye, if it is oil-soluble, may be emulsion-dispersed in an aqueous medium in the form of solution in a high boiling organic solvent.

The boiling point of the high boiling organic solvent to be used in the present invention is 150° C. or more, preferably 170° C. or more.

Examples of the high boiling organic solvent include phthalic acid esters (e.g., dibutyl phthalate, dioctyl phthalate, dicyclohexyl phthalate, di-2-ethylhexyl phthalate, decyl phthalate, bis(2,4-di-tert-amylphenyl)isophthalate, bis (1,1-diethylpropyl)phthalate), phosphoric or phosphonic acid esters (e.g., diphenyl phosphate, triphenyl phosphate, tricresyl phosphate, 2-ethylhexyl diphenyl phosphate, dioctyl butyl phosphate, tricyclohexyl phosphate, tri-2-ethylhexyl phosphate, tridodecyl phosphate, di-2-ethylhexyl phenyl phosphate), benzoic acid esters (e.g., 2-ethylhexyl benzoate, 2,4-dichlorobenzoate, dodecyl benzoate, 2-ethylhexyl-p-hydroxybenzoate), amides (e.g., N,N-diethyldodecaneamide, N,N-diethyllaurylamide), alcohols or phenols (e.g., isostearyl alcohol, 2,4-di-tert-amylphenol), aliphatic esters (e.g., dibutoxyethyl succinate, di-2-ethylhexyl succinate, 2-hexyldecyl tetradecanoate, tributyl citrate, diethyl azelate, isostearyl lactate, trioctyl citrate), aniline derivatives (e.g., N,N-dibutyl-2-butoxy-5-tert-octylaniline, etc.), chlorinated paraffins (e.g., paraffins having a chlorine content of from 10% to 80%), trimesic acid esters (e.g., tributyl trimesate), dodecyl benzene, diisopropylene naphthalene, phenols (e.g., 2,4-di-tert-amylphenol, 4-dodecyloxyphenol, 4-dodecyloxycarbonylphenol, 4-(4-dodecyloxy phenylsulfonyl) phenol), carboxylic acids (e.g., 2-(2,4-di-tert-amylphenoxybutyric acid, 2-ethoxyoctanedecanoic acid), and alkylphosphoric acids (e.g., di-2(ethylhexyl)phosphoric acid, dipheylphosphoric acid), etc. The high boiling organic solvent may be used in an amount of from 0.01 to 3 times, preferably from 0.01 to 1.0 times that of the oil-soluble dye by weight.

These high boiling organic solvents may be used singly or in admixture of two or more thereof (e.g., tricresyl phosphate and dibutyl phthalate, trioctyl phosphate and di(2-ethylhexyl)sebacate, dibutyl phthalate and poly(N-t-butylacrylamide)).

Examples of compounds other than the aforementioned high boiling organic solvents to be used in the present invention and/or methods for the synthesis of these high boiling organic solvents are described in U.S. Pat. Nos. 2,322,027, 2,533,514, 2,772,163, 2,835,579, 3,594,171, 3,676,137, 3,689,271, 3,700,454, 3,748,141, 3,764,336, 3,765,897, 3,912,515, 3,936,303, 4,004,928, 4,080,209, 4,127,413, 4,193,802, 4,207,393, 4,220,711, 4,239,851, 4,278,757, 4,353,979, 4,363,873, 4,430,421, 4,430,422, 4,464,464, 4,483,918, 4,540,657, 4,684,606, 4,728,599, 4,745,049, 4,935,321, 5,013,639, European Patents 276, 319A, 286,253A, 289,820A, 309,158A, 309,159A, 309, 160A, 509,311A, 510,576A, East German Patents 147,009, 157,147, 159,573, 225,240A, British Patent 2,091,124A, JP-A-48-47335, JP-A-50-26530, JP-A-51-25133, JP-A-51-26036, JP-A-51-27921, JP-A-51-27922, JP-A-51-149028, JP-A-52-46816, JP-A-53-1520, JP-A-53-1521, JP-A-53-15127, JP-A-53-146622, JP-A-54-91325, JP-A-54-106228, JP-A-54-118246, JP-A-55-59464, JP-A-56-64333, JP-A-56-81836, JP-A-59-204041, JP-A-61-84641, JP-A-62-118345, JP-A-62-247364, JP-A-63-167357, JP-A-63-214744, JP-A-63-301941, JP-A-64-9452, JP-A-64-9454, JP-A-64-68745, JP-A-1-101543, JP-A-1-102454, JP-A-2-792, JP-A-2-4239, JP-A-2-43541, JP-A-4-29237, JP-A-4-30165, JP-A-4-232946, JP-A-4-346338, etc.

The aforementioned high boiling organic solvents are used in an amount of from 0.01 to 3.0 times, preferably from 0.01 to 1.0 times that of the oil-soluble dye by weight.

In the present invention, the oil-soluble dye and the high boiling organic solvent are used in the form of emulsion dispersion in an aqueous medium. During emulsion dispersion, a low boiling organic solvent may be used in some cases from the standpoint of emulsifiability. As such a low boiling organic solvent there may be used an organic solvent having a boiling point of from about 30° C. to 150° C. at atmospheric pressure. For example, esters (e.g., ethyl acetate, butyl acetate, ethyl propionate, β-ethoxyethyl acetate, methyl cellosolve acetate), alcohols (e.g., isopropyl alcohol, n-butyl alcohol, secondary butyl alcohol), ketones (e.g., methyl isobutyl ketone, methyl ethyl ketone, cyclohexanone), amides (e.g., dimethylformamide, N-methylpyrrolidone), ethers (e.g., tetrahydrofurane, dioxane), etc. are preferably used, but the present invention is not limited thereto.

The emulsion dispersion is effected to disperse an oil phase having a dye dissolved in a high boiling organic solvent optionally mixed with a low boiling organic solvent in an aqueous phase mainly composed of water to make minute oil droplets of oil phase. During this procedure, additives such as surface active agent, wetting agent, dye stabilizer, emulsion stabilizer, preservative and antifungal agent described later may be added to either or both of the aqueous phase and the oil phase as necessary.

The emulsification is normally accomplished by adding the oil phase to the aqueous phase, but a so-called phase inversion emulsification method involving the dropwise addition of an aqueous phase to an oil phase is preferably used as well. Also in the case where the azo dye to be used in the present invention is water-soluble and the additives are oil-soluble, the aforementioned emulsification method may be used.

The emulsion dispersion may be effected with various surface active agents. For example, anionic surface active agents such as aliphatic acid salt, alkylsulfuric acid ester, alkylbenzenesulfonate, alkylnaphthalenesulfonate, dialkylsulfosuccinate, alkylphosphoric acid esters, naphthalenesulfonic acid-formalin condensate and polyoxyethylenealkylsulfuric acid ester, etc., and nonionic surface active agents such as polyoxyethylenealkyl ether, polyoxyethylenealkylallyl ether, polyoxyethylenealiphatic acid ester, sorbitanaliphatic acid ester, polyoxyethylenesorbitanaliphatic acid ester, polyoxyethylenealkylamine, glycerinaliphatic acid ester and oxyethyleneoxypropylene block copolymer, etc. are preferred. Alternatively, SURFYNOLS (produced by Air Products & Chemicals Inc.), which are acetylene-based polyoxyethylene oxide surface active agents, are preferably used as well. Further, amine oxide-based amphoteric surface active agents, etc. such as N,N-dimethyl-N-alkylamine oxide are preferred as well. Those listed as surface active agents in JP-A-59-157,636, pp. 37–38, and Research Disclosure No. 308119 (1989) may be used.

For the purpose of stabilizing the ink shortly after emulsification, a water-soluble polymer may be added in combination with the aforementioned surface active agents. As such a water-soluble polymer there may be preferably used a polyvinyl alcohol, polyvinyl pyrrolidone, polyethylene oxide, polyacrylic acid, polyacrylamide or copolymer thereof. Further, natural water-soluble polymers such as polysaccharides, casein and gelatin, etc. may be preferably used. For the purpose of stabilizing the dye dispersion, polyvinyls obtained by the polymerization of acrylic acid esters, methacrylic acid esters, vinyl esters, acrylamides, methacrylamides, olefins, styrenes, vinylethers or acrylonitriles, polyurethanes, polyesters, polyamides, polyureas, polycarbonates, etc., which are substantially insoluble in an aqueous medium, may be used in combination. These polymers preferably have —$SO_3^-$ or —$COO^-$. In the case where these polymers substantially insoluble in an aqueous medium are used in combination, they are preferably used in an amount of 20% by weight or less, preferably 10% by weight or less based on the amount of the high boiling organic solvent.

In the case where emulsion dispersion is effected to disperse the oil-soluble dye or high boiling organic solvent to make an aqueous ink, a particularly important factor is control over the particle size of the aqueous ink. In order to enhance the color purity or density during the formation of an image by ink ejection, it is essential to reduce the average particle size. The volume-average particle diameter of the aqueous ink is preferably 1 μm or less, more preferably from 5 nm to 100 nm.

The measurement of the volume-average particle diameter and the particle size distribution of the dispersed particles can be easily accomplished by any known method such as static light scattering method, dynamic light scattering method, centrifugal sedimentation method and method as disclosed in "Jikken Kagaku Koza (Institute of Experimental Chemistry)", 4th ed., pp. 417–418. For example, measurement can be easily carried out by diluting the ink with distilled water such that the particle concentration in the ink reaches 0.1% to 1% by weight, and then subjecting the solution to measurement using a commercially available volume-average particle diameter measuring instrument (e.g., Microtrack UPA (produced by NIKKISO CO., LTD.). Further, dynamic light scattering method utilizing laser doppler effect is particularly preferred because it is capable of measuring even small particle size.

The term "volume-average particle diameter" is meant to indicate average particle diameter weighted with particle volume, which is obtained by dividing the sum of the product of the diameter and the volume of individual particles in the aggregate of particles by the total volume of the particles. The details of volume-average particle diameter are described in Souichi Muroi, "Koubunshi Ratekkusu no Kagaku (Chemistry of Polymer Latexes)", Koubunshi Kankokai, page 119.

It was also made obvious that the presence of coarse particles has an extremely great effect on the printing properties. In other words, coarse particles clog the head nozzle, or even if coarse particles don't go so far as to clog the head nozzle, they form blots whereby the ink cannot be ejected or can be deviated when ejected, giving a serious effect on the printing properties. In order to prevent this trouble, it is important to keep the number of particles of 5 μm or more and 1 μm or more in the resulting ink to 10 or less and 1,000 or less, respectively.

The removal of these coarse particles can be accomplished by any known method such as centrifugal separation method and precision filtration method, etc. The separation step may be effected shortly after emulsion dispersion or shortly before the filling of the emulsion dispersion comprising various additives such as wetting agent and surface active agent in the ink cartridge.

As an effective unit for reducing the average particle diameter of particles and eliminating coarse particles there may be used a mechanical emulsifier.

As such an emulsifier there may be used any known device such as simple stirrer, impeller type agitator, in-line agitator, mill type agitator (e.g., colloid mill, etc.) and ultrasonic agitator, and, the use of a high pressure homogenizer is particularly preferred.

The details of the mechanism of high pressure homogenizer are described in U.S. Pat. No. 4,533,254, JP-A-6-47264, etc., and, examples of commercially available high pressure homogenizers include Gaulin homogenizer (produced by A. P. V GAULLN INC.), microfluidizer (produced by MICROFLUIDEX INC.) and altimizer (produced by SUGINO MACHINE LIMITED), etc.

In recent years, a high pressure homogenizer having a mechanism for atomizing a material in a ultrahigh pressure jet stream as disclosed in U.S. Pat. No. 5,720,551 is particularly useful in the emulsion dispersion of the invention. An example of the emulsifier using a ultrahigh pressure jet stream is De BEE2000 (produced by BEE INTERNATIONAL LTD.).

The pressure at which emulsion is carried out by a high pressure emulsion disperser is 50 MPa or more, preferably 60 MPa or more, more preferably 180 MPa or more.

For example, the combined use of two or more emulsifiers as in a method involving the emulsification by an agitated emulsifier followed by the passage through a high pressure homogenizer is particularly preferred. Alternatively, a method is preferably used which comprises effecting the emulsifying dispersion of the material using such an emulsifier, adding additives such as wetting agent and surface active agent, and then passing the ink again through the high pressure homogenizer before being filled in the cartridge.

In the case where the dye composition comprises a low boiling organic solvent incorporated therein in addition to the high boiling organic solvent, it is preferred to remove the low boiling solvent from the standpoint of emulsion stability and safety/hygiene. The removal of the low boiling solvent can be accomplished by any known method depending on the kind of the solvent to be removed. In some detail, evaporation method, vacuum evaporation method, ultrafiltration method, etc. may be used. The step of removing the low boiling organic solvent is preferably effected as rapidly as possible shortly after emulsification.

The ink for ink jet recording obtained in the present invention may comprise properly selected additives incorporated therein in a proper amount such as drying inhibitor for preventing the clogging of the ejection nozzle with dried ink, penetration accelerator for helping the ink to penetrate in the paper, ultraviolet absorber, oxidation inhibitor, viscosity adjustor, surface tension adjustor, dispersant, dispersion stabilizer, antifungal agent, rust preventive, pH adjustor, anti-foaming agent and chelating agent, etc.

As the drying inhibitor in the invention there is preferably used a water-soluble organic solvent having a lower vapor pressure than water. Specific examples of the water-soluble organic solvent include polyvalent alcohols such as ethylene glycol, propylene glycol, diethylene glycol, polyethylene glycol, thiodiglycol, dithiodiglycol, 2-methyl-1,3-propanediol, 1,2,6-hexanetriol, acetylene glycol derivative, glycerin and trimethylolpropane, etc., lower alkylethers of polyvalent alcohol such as ethylene glycol monomethyl(or ethyl) ether, diethylene glycol monomethyl(or ethyl)ether and triethylene glycol monoethyl (or butyl)ether, etc., heterocyclic compounds such as 2-pyrrolidone, N-methyl-2-pyrrolidone, 1,3-dimethyl-2-imidazolidinone and N-ethyl-morpholine, etc., sulfur-containing compounds such as sulfolane, dimethylsulfoxide and 3-sulfolene, etc., polyfunctional compounds such as diacetone alcohol and diethanolamine, etc., and urea derivatives. Preferred among these water-soluble organic solvents are polyvalent alcohols such as glycerin and diethylene glycol, etc. These drying inhibitors may be used singly or in combination of two or more thereof. These drying inhibitors are preferably incorporated in the ink in an amount of from 10% to 50% by weight.

Examples of the penetration accelerator employable herein include alcohols such as ethanol, isopropanol, butanol, di(tri)ethylene glycol monobutyl ether and 1,2-hexanediol, sodium laurylsulfate, sodium oleate, and non-ionic surface active agents, etc. These penetration accelerators can exert a sufficient effect when incorporated in the ink in an amount of from 10% to 30% by weight. These penetration accelerators are preferably used in an amount such that no print bleeding or print through occurs.

Examples of the ultraviolet absorber to be used to enhance the preservability of the image in the present invention include benzotriazole-based compounds as disclosed in JP-A-58-185677, JP-A-61-190537, JP-A-2-782, JP-A-5-197075 and JP-A-9-34057, benzophenone-based compounds as disclosed in JP-A-46-2784, JP-A-5-194483 and U.S. Pat. No. 3,214,463, cinnamic acid-based compounds as disclosed in JP-B-48-30492, JP-A-56-21141 and JP-A-10-88106, triazine-based compounds as disclosed in JP-A-4-298503, JP-A-8-53427, JP-A-8-239368, JP-A-10-182621 and JP-T-8-501291, compounds as disclosed in Research Disclosure No. 24239, and compounds which absorb ultraviolet rays to emit fluorescence, i.e., so-called fluorescent brighteners, such as stilbene-based and benzoxazole-based compounds.

In the present invention, as the oxidation inhibitor to be used to enhance the image preservability there may be used any of various organic and metal complex-based fading inhibitors. Examples of the organic fading inhibitors include hydroquinones, alkoxyphenols, dialkoxyphenols, phenols, anilines, amines, indanes, chromans, alkoxyanilines, and heterocyclic compounds, and, examples of the metal complex-based fading inhibitors include nickel complex, and zinc complex. Specific examples of these oxidation inhibitors include compounds listed in the patents cited in Research Disclosure No. 176P43, Articles VI-I and J, Research Disclosure No. 15162, Research Disclosure No. 18716, left column, page 650, Research Disclosure No. 36544, page 527, Research Disclosure No. 307105, page 872, and Research Disclosure No. 15162, and compounds included in the formula and examples of representative compounds listed in JP-A-62-215272, pp. 127–137.

Examples of the antifungal agent to be used in the present invention include sodium dehydroacetate, sodium benzoate, sodium pyridinethione-1-oxide, ethyl p-hydroxybenzoate, 1,2-benzoisothiazoline-3-one, and salts thereof. These antifungal agents are preferably incorporated in the ink in an amount of from 0.02% to 5.00% by weight.

The details of these antifungal agents are described in "Bokin Bobizai Jiten (Dictionary of Anti-bacterial and Antifungal Agents")", compiled by Dictionary Compilation Committee of The Society for Antibacterial and Antifungal Agents, Japan.

Examples of the rust preventive include acidic sulfites, sodium thiosulfate, ammonium thioglycolate, diisopropylammonium nitrite, pentaerthyritol tetranitrate, dicyclohexylammonium nitrite, and benzotriazole. These rust preventives are preferably incorporated in the ink in an amount of from 0.02% to 5.00% by weight.

The pH adjustor to be used in the present invention is preferably used for the purpose of adjusting the pH value, providing dispersion stability or like purposes. It is preferred that the pH value of the ink be adjusted to a range of from 4 to 11 at 25° C. When the pH value of the ink falls below 4, the resulting dye exhibits a deteriorated solubility, causing nozzle clogging, and, on the contrary, when the pH value of the ink exceeds 11, the resulting ink tends to exhibit a deteriorated water resistance. Examples of the pH adjustor include basic pH adjustors such as organic base and inorganic alkali, and acidic pH adjustors such as organic acid and inorganic acid.

Examples of the aforementioned organic base include triethanolamine, diethanolamine, N-methyldiethanolamine, dimethylethanolamine, etc. Examples of the aforementioned inorganic alkali include hydroxide of alkaline metal (e.g., sodium hydroxide, lithium hydroxide, potassium hydroxide), carbonate of alkaline metal (e.g., sodium carbonate, sodium hydrogen carbonate), and ammonium. Further, examples of the aforementioned organic acid include acetic acid, propionic acid, trifluoroacetic acid, alkylsulfonyl acid, etc. Examples of the aforementioned in organic acid include hydrochloric acid, sulfuric acid, phosphoric acid, etc.

Referring to the process for the production of the ink for ink jet recording of the present invention, a process for the production of the ink for ink jet recording involving the dissolution and/or dispersion of at least one dye represented by the aforementioned formula (1) in a medium involves a step of applying at least ultrasonic vibration to make effective stabilization that enhances ejection stability or hue.

In the present invention, an ultrasonic energy equal to or greater than the energy received by the recording head has been previously applied during the production of the ink to remove bubbles to prevent the generation of bubbles due to the pressure applied to the ink by the recording head.

The ultrasonic vibration is an ultrasonic wave having a frequency of normally 20 kHz or more, preferably 40 kHz or more, more preferably 50 kHz. The energy applied to the solution by the ultrasonic vibration is normally $2 \times 10^7$ J/m$^3$ or more, preferably $5 \times 10^7$ J/m$^3$ or more, more preferably $1 \times 10^8$ J/m$^3$ or more. The time during which the ultrasonic vibration is applied is normally from about 10 minutes to 1 hour.

The step of applying ultrasonic vibration may be effected at any time after the incorporation of the dye in the medium to exert the effect. Even when the ultrasonic vibration is applied after the storage of the ink completed, the effect can be exerted. However, it is preferred that the ultrasonic vibration be applied during the dissolution and/or dispersion of the dye in the medium because the effect of removing bubbles can be more exerted and the dissolution and/or dispersion of the dyestuff in the medium can be accelerated by the ultrasonic vibration.

In other words, the aforementioned step of applying at least ultrasonic vibration may be effected either during or after the step of dissolving and/or dispersing the dye in the medium. In other words, the aforementioned step of applying at least ultrasonic vibration may arbitrary be effect one or more times between after the preparation of the ink and the completion of the product.

In the present invention, the step of dissolving and/or dispersing the dye in the medium preferably involves a step of dissolving the aforementioned dye in a part of the entire medium and a step of adding the rest of the medium, and it is preferred that ultrasonic vibration be applied at least at any of the aforementioned steps, more preferably at least at the step of dissolving the dye in a part of the entire medium.

The aforementioned step of adding the rest of the medium may consist of a single step or a plurality of steps.

Further, the process for the production of the ink according to the present invention is preferably accompanied by heat deaeration or deaeration under reduced pressure to enhance the effect of removing bubbles from the ink. Heat deaeration or vacuum deaeration is preferably effected at the same time with or after the step of adding the rest of the medium to the solution.

Examples of the unit for generating ultrasonic vibration at the step of giving ultrasonic vibration include known devices such as ultrasonic dispersing machine.

In the present invention, the medium is preferably water or an aqueous medium which is a mixture of water and a water-miscible organic solvent.

In the process for the preparation of the ink composition according to the invention, it is important to effect a step of removing dust as solid content by filtration for the purpose of improving stability and hue. For this job, a filter is used, and, as such a filter there is used a filter having an effective pore diameter of 1 μm or less, preferably from 0.05 μm to 0.3 μm, particularly from 0.25 μm to 0.3 μm. As the filter material there may be used any of various materials, and, specifically in the case where a water-soluble dye ink is used, a filter prepared for aqueous solvent is preferably used. In particular, a jacket-type filter made of a polymer material which can difficultly give dust is preferably used. Filtration may be accomplished by pumping the solution through the jacket or may be effected under pressure or reduced pressure.

Filtration is often accompanied by the entrapment of air in the solution. Since bubbles due to air thus entrapped can often cause disturbance in image in the ink jet recording, the defoamamation step is provided separately in the invention. As the defoamamation method there may be used various methods such as ultrasonic defoamamation and vacuum defoamamation.

These jobs are preferably effected in a space such as clean room or clean bench to prevent the contamination by dust during work. In the present invention, these jobs are effected in a space having a cleanness degree of 100 class or less.

The viscosity of the ink of the present invention is preferably from 1 to 30 mPa·s at 25° C. More preferably, it is from 2 to 15 mPa·s, particularly from 2 to 10 mPa·s. When the viscosity of the ink exceeds 30 mPa·s, the resulting recorded image can be fixed only at a reduced rate and the resulting ink exhibits a deteriorated ejectability. When the viscosity of the ink falls below 1 mPa·s, the resulting recorded image undergoes bleeding and thus exhibits a reduced quality.

The adjustment of viscosity can be arbitrarily carried out by controlling the added amount of the ink solvent. Examples of the ink solvent include glycerin, diethylene glycol, triethanolamine, 2-pyrrolidone, diethylene glycol monobutyl ether, and triethylene glycol monobutyl ether.

The added amount of the ink solvent for adjusting viscosity is preferably from 5 to 70% by weight, more preferably from 10 to 60% by weight based on the ink for ink jet recording. Further, two or more ink solvents may be used in combination.

Further, in the present invention, a viscosity adjustor may be used. Examples of the viscosity adjustor include celluloses, water-soluble polymers such as polyvinyl alcohol, and nonionic surface active agents. The details of these viscosity adjustors are described in "Nendo Chousei Gijutsu (Technology for Viscosity Adjustment)", Gijutsu Joho Kyoukai, Article 9, 1999, and "Inku Jetto Purintayou Kemikaruzu (98 zouho)—Zairyou no Kaihatsu Doko/Tenbo Chousa (Chemicals for Ink Jet Printer (98 enlarged edition)—Research on Trend and View of Development of Materials)", CMC, pp. 162–174, 1997.

The method for the measurement of viscosity of liquid is described in detail in JIS Z8803, but the viscosity of liquid can be simply measured using a commercially available viscometer. Examples of the rotary viscometer include Type B viscometer and Type E viscometer produced by Tokyo Keiki Kogyo K.K. In the present invention, a Type VM-100A-L vibration viscometer (produced by YAMAICHI ELECTRONICS CO., LTD.) was used to measure viscosity at 25° C. The unit of viscosity is Pa·s. In general, however, mPa·s is used.

The ink for ink jet recording to be used in the present invention preferably has a static surface tension of from 25 to 50 mN/m at 25° C. More preferably, it is from 30 to 40 mN/m at 25° C. When the static surface tension of the ink exceeds 50 mN/m, the resulting ink exhibits a drastic deterioration in print quality such as ejection stability and resistance to bleeding and whisker during color mixing (e.g., string-like bleeding may be generated from black letter when black letter is printed on a solid cyan image). On the contrary, when the static surface tension of the ink falls below 25 mN/m, the resulting ink can be attached to hard surface when ejected, causing defective printing.

As the static surface tension measuring methods there are known capillary rise method, dropping method, and ring method, but, in the invention, as the static surface tension measuring method there is used a perpendicular plate method. The principle of the perpendicular plate method will be described below.

When a thin glass or platinum plate is hanged vertically while a part thereof being dipped in a liquid, surface tension of the liquid acts downward along the length of the plate in contact with the liquid. The surface tension is measured by balancing this force by a upward force that hangs the plate.

The dynamic surface tension of the ink to be used in the present invention is preferably from 25 to 50 mN/m, more preferably from 30 to 40 mN/m at 25° C. When the dynamic surface tension of the ink exceeds 50 mN/m, the resulting ink exhibits a drastic deterioration in print quality such as ejection stability and resistance to bleeding and whisker during color mixing. On the contrary, when the dynamic surface tension of the ink falls below 25 mN/m, the resulting ink can be attached to hard surface when ejected, causing defective printing.

As dynamic surface tension measuring methods there are known vibration jet method, meniscus dropping method and maximum bubble pressure method as disclosed in "Shinjikken Kagaku Koza (New Institute of Experimental Chemistry), Vol.18 ed., Kaimen to Koroido (Interface and Colloid)", Maruzen, pp. 69–90 (1977), and a liquid film destruction method is known as disclosed in JP-A-3-2064, but, in the present invention, as the dynamic surface tension measuring method there is used a differential bubble pressure method. The principle and method of effecting this measuring method will be described hereinafter.

When bubbles are formed in a solution to which a surfactant is added and which has been stirred to uniformity, a new gas-liquid interface is produced, and surface active agent molecules in the solution then gather on the surface of water at a constant rate. The bubble rate (rate of formation of bubbles) is changed. As the formation rate decreases, more surface active agent gather on the surface of bubbles, reducing the maximum bubble pressure shortly before the burst of bubbles, and the maximum bubble pressure (surface tension) with respect to bubble rate can be thus detected. In the measurement of dynamic surface tension in the present invention, bubbles are formed in a solution using a large probe and a small probe, the differential pressure of the two probes in the state of maximum bubble pressure is measured, and the dynamic surface tension is then calculated from the differential pressure.

Using a surface tension adjustor, the static surface tension and the dynamic surface tension can be adjusted to the aforementioned range.

Examples of the surface tension adjustor employable herein include nonionic, cationic or anionic surface active agents. Examples of the anionic surface active agent include aliphatic acid salts, alkylsulfuric acid ester salts, alkylbenzenesulfonates (e.g., alkylbenzenesulfonate, petroleum sulfonate), dialkylsulfosuccinates, alkylphosphoric acid esters, naphthalenesulfonic acid-formalin condensates, and polyoxyethylenealkylsulfuric acid esters. Examples of the nonionic surface active agent include acetylene-based diols (e.g., 2,4,7,9-tetramethyl-5-decyne-4,7-diol), polyoxyethylenealkyl ethers (e.g., polyoxyethylenedecyl ether, ethylene oxide adduct of acetylene-based diol), polyoxyethylenealiphatic acid esters, sorbitanaliphatic acid esters, polyoxyethylenesorbitanaliphatic acid esters, polyoxyethylenealkylamines, glycerinaliphatic acid esters, and oxyethyleneoxypropylene block copolymers.

Further, amine oxide-based amphoteric surface active agents such as N,N-dimethyl-N-alkylamine oxide are preferred. Moreover, those listed as surface active agents in JP-A-59-157,636, pp. 37–38, and Research Disclosure No. 308119, 1989, may be used.

Anionic surface active agents having a two-chain or branched hydrophobic moiety, anionic or nonionic surface active agents having a hydrophilic group in the vicinity of the center of hydrophobic moiety and nonionic surface active agents having a two-chain or branched hydrophobic moiety are preferred because they can be difficultly precipitated or separated out from the ink and cause little foaming.

Examples of the nonionic surface active agents having a two-chain or branched hydrophobic moiety include a compound represented by the formula (A).

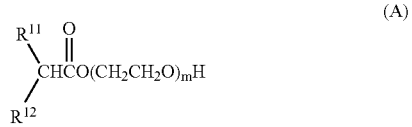

(A)

In the formula (A), $R^{11}$ and $R^{12}$ each represents a $C_2$–$C_{20}$ saturated hydrocarbon preferably, $C_4$–$C_{13}$ saturated hydrocarbon, and more preferably, the sum of the number of carbon atoms in $R^{11}$ and $R^{12}$ is from 8 to 18. The suffix m represents from 2 to 40, preferably from 4 to 30, more preferably from 4 to 20.

The compound represented by the formula (A) can be obtained by the method described in Takehiko Fujimoto, "Shin Kaimen Kasseizai Nyumon (New Introduction to Surface Active Agents)", completely revised version, 1992, page 107.

Examples of the nonionic surface active agent represented by the formula (A) include singly-terminated ester of polyethylene oxide of 2-butyloctanoic acid, polyethylene oxide adduct of undecane-6-ol, etc.

The nonionic surface active agent having a hydrophilic group in the vicinity of the center of hydrophobic moiety is preferably a compound represented by the formula (B).

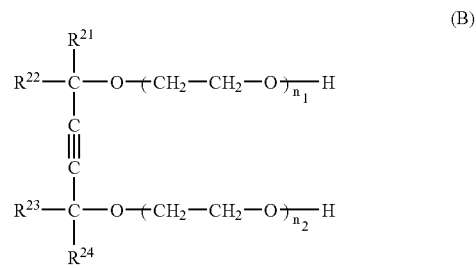

(B)

In the formula (B), $R^{21}$, $R^{22}$, $R^{23}$ and $R^{24}$ each independently represents a $C_1$–$C_6$, preferably $C_1$–$C_4$ alkyl group, and $n_1$ and $n_2$ each represents a number such that the sum of $n_1$ and $n_2$ is from 0 to 40, preferably from 2 to 20.

Preferred examples of the nonionic surface active agent represented by the formula (B) include ethylene oxide adducts of acetylene-based diol (SURFYNOL Series (Air Products & Chemicals)), etc., and preferred among these nonionic surface active agents are those having a molecular weight of from 200 to 1,000, more preferably from 300 to 900, particularly from 400 to 900.

By incorporating a surface active agent in the ink for ink jet recording of the present invention to adjust the liquid physical properties such as surface tension of the ink, the ejection stability of the ink can be enhanced, making it possible to exert an excellent effect of improving the water resistance of image and preventing the bleeding of printed ink.

The content of the surface active agent for this purpose is from 0.001 to 15% by weight, preferably from 0.005 to 10% by weight, more preferably from 0.01 to 5% by weight based on the weight of the ink.

The ink of the present invention is characterized by the electrical conductance falling within a range of from 0.01 to 10 S/m. A particularly preferred range of electrical conductance is from 0.05 to 5 S/m.

The measurement of electric conductance can be accomplished by en electrode method using a commercially available saturated potassium chloride.

The electric conductance of the ink can be controlled mainly by the ionic concentration of the aqueous solution. In the case where the salt concentration is high, desalting may be effected using a ultrafiltration membrane or the like.

Further, in the case where salts or the like are added to adjust electric conductance, various organic or inorganic salts may be added.

As the inorganic salts there may be used inorganic compounds such as potassium halide, sodium halide, sodium sulfate, potassium sulfate, sodium hydrogensulfate, potassium hydrogensulfate, sodium nitrate, potassium nitrate, sodium hydrogencarbonate, potassium hydrogencarbonate, sodium phosphate, disodium hydrogenphosphate, boric acid, potassium dihydrogenphosphate and sodium dihydrogenphosphate, and organic compounds such as sodium acetate, potassium acetate, potassium tartrate, sodium tartrate, sodium benzoate, potassium benzoate, sodium p-toluenesulfonate, potassium saccharinate, potassium phthalate and sodium picolate may be used.

Alternatively, the selection of the component the aqueous media listed below makes it possible to adjust the electric conductance of the inks.

The ink of the present invention is characterized in that the percent change of viscosity at 10° C. from at 25° C. is 250% or less and the percent change of surface tension at 10° C. from at 25° C. is 130% or less. When the percent viscosity change exceeds 250% or the percent surface tension change exceeds 130%, the ejection stability is remarkably deteriorated. In order to obtain stable ejection properties even in various atmospheres, it is very important that the change of physical properties is as small as possible. In particular, viscosity and surface tension must be severely controlled.

The percent change of viscosity at 10° C. from at 25° C. is preferably 200% or less, more preferably 190% or less, and the percent change of surface tension at 10° C. from at 25° C. is preferably 125% or less, more preferably 120% or less.

In the present invention, the calculation of the percent change of viscosity at 10° C. from at 25° C. and the percent change of surface tension at 10° C. from at 25° C. can be conducted using the following equation.

(suu-1)

$$\% \text{ Change of viscosity at } 10° \text{ C. from at } 25° \text{ C.} = \frac{\text{Viscosity at } 10° \text{ C.}}{\text{Viscosity at } 25° \text{ C.}} \times 100\ (\%)$$

$$\% \text{ Change of surface tension at } 10° \text{ C. from at } 25° \text{ C.} = \frac{\text{Surface tension at } 10° \text{ C.}}{\text{Surface tension at } 25° \text{ C.}} \times 100\ (\%)$$

An image printed with an ink for ink jet recording comprising a magenta dye according to the present invention and having the aforesaid composition and ink physical properties undergoes ink bleeding on a low level. The bleeding of the ink according to a typical embodiment of the present invention on an image-receiving material having an image-receiving layer containing white inorganic pigment particles provided on a support is on a visually undetectable level at least distance of distinct vision. Further, the bleeding of the ink on an image-receiving material comprising a gelatin-containing hardened layer as an image-recording layer is also on a visually undetectable level at least distance of distinct vision. In particular, an image drawn with a magenta ink according to the present invention has an excellent bleeding resistance also when stored at high temperature and humidity.

The bleeding is attributed to the properties of dyes as well as various factors such as content and kind of auxiliary solvents added for adjustment of physical properties of ink and prevention of drying of ink such as glycerin, diethylene glycol and triethylene glycol monobutyl ether, residual amount of solvents, image structure and condition of overlapping of secondary colors (red and blue). In order to improve bleeding resistance in the ink formulation, it is effective to properly select dyes, reduce the weight of auxiliary solvents and optimize the surface tension of the ink (from 30 to 37 mPa·s, preferably from 33 to 37 mPa·s).

The degree of bleeding depends on the kind of the image-receiving paper, but the ink of the present invention is characterized in that it causes no bleeding even when the kind of the image-receiving paper is changed.

In order to improve bleeding resistance by properly designing the ink formulation, it is preferred to use a solvent having a low dye solubility. In the case of the dyes of the present invention, glycerin and PFG (propylene glycol monopropyl ether) are preferably used. Another method of improving bleeding resistance is to raise the mordanting power and hence introduce an anchoring compound for mordanting. In some detail, a betaine compound is used to raise the interaction between mordant and dye.

The details of the method for the preparation of the ink for ink jet recording are described in JP-A-5-148436, JP-A-5-295312, JP-A-7-97541, JP-A-7-82515 and JP-A-7-118584 and can apply also to the preparation of the ink for ink jet recording according to the present invention.

The recording paper and recording film on which an image is drawn with the ink of the present invention will be described hereinafter. In the present invention, known recording materials, i.e., ordinary paper, resin-coated paper, paper dedicated to ink jet recording as described in JP-A-8-169172, JP-A-8-27693, JP-A-2-276670, JP-A-7-276789, JP-A-9-323475, JP-A-62-238783, JP-A-10-153989, JP-A-10-217473, JP-A-10-235995, JP-A-10-337947, JP-A-10-217597, JP-A-10-337947, etc., paper dedicated also to electrophotography, cloth, film, glass, metal, pottery, etc. may be used.

The recording paper and recording film for use in ink jet printing with the ink of the present invention will be described hereinafter. As the support in the recording paper and recording film there may be used one obtained by processing a chemical pulp such as LBKP and NBKP, a mechanical pulp such as GP, PGW, RMP, TMP, CTMP, CMP and CGP, used paper pulp such as DIP or the like, optionally mixed with known additives such as pigment, binder, sizing agent, fixing agent, cationic agent and paper strength improver, through various paper machines such as foundrinier paper machine and cylinder paper machine. As the support there may be used either a synthetic paper or plastic film sheet besides these support, and the thickness of the support is preferably from 10 μm to 250 μm and the basis weight of the support is preferably from 10 to 250 g/m².

An image-receiving layer and a back coat layer may be provided on the support directly or with a size press or anchor coat layer of starch, polyvinyl alcohol or the like interposed therebetween to prepare a material for a receiving material of the ink of the present invention. The support may be further subjected to leveling using a calendering machine such as machine calender, TG calender and soft calender.

In the present invention, as the support there is preferably used a paper or plastic film laminated with a polyolefin (e.g., polyethylene, polystyrene, polybutene, copolymer thereof) or polyethylene terephthalate on both sides thereof. The polyolefin preferably comprises a white pigment (e.g., titanium oxide, zinc oxide) or a tinting dye (e.g., cobalt blue, ultramarine, neodymium oxide) incorporated therein.

The image-receiving layer to be provided on the support will be described hereinafter. The image-receiving layer comprises a porous material or aqueous binder incorporated therein. The image-receiving layer also preferably comprises a pigment incorporated therein, and as such a pigment there is preferably used a white pigment. Examples of the white pigment employable herein include inorganic white pigments such as calcium carbonate, kaolin, talc, clay, diatomaceous earth, synthetic amorphous silica, aluminum silicate, magnesium silicate, calcium silicate, aluminum hydroxide, alumina, lithopone, zeolite, barium sulfate, calcium sulfate, titanium dioxide, zinc sulfate and zinc carbonate, and organic pigments such as styrene-based pigment, acrylic pigment, urea resin and melamine resin. Particularly preferred among these pigments are porous inorganic white pigments, and in particular, synthetic amorphous silica having a large pore area, etc. are preferred. As the synthetic amorphous silica there may be also used anhydrous silicate obtained by dry method (gas phase method) or hydrous silicate obtained by wet method.

Specific examples of the recording paper comprising the aforementioned pigments incorporated in the image-receiving layer include those disclosed in JP-A-10-81064, JP-A-10-119423 JP-A-10-157277, JP-A-10-217601, JP-A-11-348409, JP-A-2001-138621, JP-A-2000-43401, JP-A-2000-211235, JP-A-2000-309157, JP-A-2001-96897, JP-A-2001-138627, JP-A-11-91242, JP-A-8-2087, JP-A-8-2090, JP-A-8-2091, JP-A-8-2093, JP-A-174992, JP-A-11-192777, JP-A-2001-301314, etc.

Examples of the aqueous binder to be incorporated in the image-receiving layer include water-soluble polymers such as polyvinyl alcohol, silanol-modified polyvinyl alcohol, starch, cationated starch, casein, gelatin, carboxymethyl cellulose, hydroxyethyl cellulose, polyvinyl pyrrolidone, polyalkylene oxide and polyalkylene oxide derivative, water-dispersible polymers such as styrene butadiene latex and acryl emulsion, etc. These aqueous binders may be used singly or in combination of two or more thereof. In the present invention, particularly preferred among these aqueous binders are polyvinyl alcohol and silanol-modified polyvinyl alcohol from the standpoint of adhesion to pigment and exfoliation resistance of ink-receiving layer.

The image-receiving layer may comprise a mordant, a waterproofing agent, a light-resistance improver, a gas resistance improver, a surface active agent, a film hardener and other additives incorporated therein besides the pigments and aqueous binders.

The mordant to be incorporated in the image-receiving layer is preferably passivated. To this end, a polymer mordant is preferably used in terms of bleeding resistance.

For the details of the polymer mordant, reference can be made to JP-A-48-28325, JP-A-54-74430, JP-A-54-124726, JP-A-55-22766, JP-A-55-142339, JP-A-60-23850, JP-A-60-23851, JP-A-60-23852, JP-A-60-23853, JP-A-60-57836, JP-A-60-60643, JP-A-60-118834, JP-A-60-122940, JP-A-60-122941, JP-A-60-122942, JP-A-60-235134, JP-A-1-161236, U.S. Pat. Nos. 2,484,430, 2,548,564, 3,148,061, 3,309,690, 4,115,124, 4,124,386, 4,193,800, 4,273,853, 4,282,305 and 4,450,224. An image-receiving material containing a polymer mordant disclosed in JP-A-1-161236, pp. 212 to 215 is particularly preferable. The use of the polymer mordant disclosed in the above cited patent makes it possible to obtain an image having an excellent quality free of bleeding and hence improve the light-resistance of the image.

The waterproofing agent can be used to render the image waterproof, and as such a waterproofing agent there is preferably used a cationic resin in particular. Examples of such a cationic resin include polyamide polyamine epichlorohydrin, polyethylenimine, polyamine sulfone, dimethyl diallyl ammonium chloride polymer, and cation polyacrylamide. The content of such a cationic resin is preferably from 1% to 15% by weight, particularly from 3% to 10% by weight based on the total solid content of the ink-receiving layer.

Examples of the light-resistance improver and gas resistance improver include phenol compounds, hindered phenol compounds, thioether compounds, thiourea compounds, thiocyanic acid compounds, amine compounds, hindered amine compounds, TEMPO compounds, hydrazine compounds, hydrazide compounds, amidine compounds, vinyl-containing compounds, ester compounds, amide compounds, ether compounds, alcohol compounds, sulfinic acid compounds, saccharides, water-soluble reducing compounds, organic acids, inorganic acids, hydroxyl-containing organic acids, benzotriazole compounds, benzophenone compounds, triazine compounds, heterocyclic compounds, water-soluble metal salts, organic metal compounds, and metal complexes.

Specific examples of these compounds include those disclosed in JP-A-10-182621, JP-A-2001-260519, JP-A-2000-260519, JP-B-4-34953, JP-B-4-34513, JP-B-4-34512, JP-A-11-170686, JP-A-60-67190, JP-A-7-276808, JP-A-2000-94829, JP-T-8-512258, and JP-A-11-321090.

The surface active agent acts as a coating aid, releasability improver, slipperiness improver or antistat. For the details of the surface active agent, reference can be made to JP-A-62-173463 and JP-A-62-183457.

An organic fluoro-compounds may be used instead of the surface active agent. The organic fluoro-compound is preferably hydrophobic. Examples of the organic fluoro-compound include fluorine-based surface active agents, oil-based fluorine compounds (e.g., fluorine-based oil), and solid fluorine-based compound resins (e.g., tetrafluoroethylene resin). For the details of the organic fluoro-compound, reference can be made to JP-B-57-9053 (8th to 17th columns), JP-A-61-20994, and JP-A-62-135826.

As the film hardener there may be used any of materials disclosed in JP-A-1-161236, page 222, JP-A-9-263036, JP-A-10-119423, and JP-A-2001-310547.

Other examples of additives to be incorporated in the image-receiving layer include pigment dispersants, thickening agents, antifoaming agents, dyes, fluorescent brighteners, preservatives, pH adjustors, matting agents, and film hardeners. There may be provided one or two ink-receiving layers.

The recording paper and recording film may comprise a back coat layer provided thereon. Examples of the components which can be incorporated in the back coat layer include white pigments, aqueous binders, and other components.

Examples of the white pigments to be incorporated in the back coat layer include inorganic white pigments such as light calcium carbonate, heavy calcium carbonate, kaolin, talc, calcium sulfate, barium sulfate, titanium dioxide, zinc oxide, zinc sulfide, zinc carbonate, satin white, aluminum silicate, diatomaceous earth, calcium silicate, magnesium silicate, synthetic amorphous silica, colloidal silica, colloidal alumina, pseudo-boehmite, aluminum hydroxide, alumina, lithopone, zeolite, hydrated halloysite, magnesium carbonate and magnesium hydroxide, and organic pigments such as styrene-based plastic pigment, acrylic plastic pigment, polyethylene, microcapsule, urea resin and melamine resin.

Examples of the aqueous binder to be incorporated in the back coat layer include water-soluble polymers such as styrene/maleate copolymer, styrene/acrylate copolymer, polyvinyl alcohol and silanol, and water-dispersible polymers such as styrenebutadiene latex and acryl emulsion. Examples of other components to be incorporated in the back coat layer include antifoaming agents, foaming inhibitors, dyes, fluorescent brightening agents, preservatives, and waterproofing agents.

The layers (including back layer) constituting the ink jet recording paper and film may comprise a dispersion of polymer fine particles incorporated therein. The dispersion of polymer fine particles is used for the purpose of improving physical properties of film, e.g., stabilizing dimension, inhibiting curling, adhesion and film cracking. For the details of the dispersion of polymer fine particles, reference can be made to JP-A-62-245258, JP-A-62-1316648, and JP-A-62-110066. The incorporation of a dispersion of polymer fine particles having a low glass transition temperature (40° C. or less) in a layer containing a mordant makes it possible to prevent the cracking or curling of the layer. The incorporation of a dispersion of polymer fine particles having a high glass transition temperature, too, in the back layer makes it possible to prevent the curling of the back layer.

The ink jet recording method to which the ink of the invention is applied is not limited, and the ink of the present invention may be used in any known recording method such as electrostatic control method which utilizes electrostatic attraction to eject ink, drop-on-demand method (pressure pulse method) utilizing vibrational pressure of piezoelectric element, acoustic ink jet method which comprises converting electrical signal to acoustic beam with which the ink is irradiated to produce a radiation pressure that is utilized to eject the ink and thermal ink jet (bubble jet) method which comprises heating the ink to form bubbles that raise the pressure.

Examples of the ink jet recording method include a method which comprises ejecting many portions of an ink having a low concentration called photoink in a small volume, a method which comprises using a plurality of inks having substantially the same hue but different densities to improve the image quality, and a method involving the use of a colorless transparent ink.

EXAMPLE

The present invention will be further described in the following examples, but the present invention is not construed as being limited thereto.

Example 1

To the following components was added deionized water to make 1 l, and the mixture was then heated to from 30° C. to 40° C. with stirring for 1 hour. Thereafter, the solution was adjusted to pH 9 with a 10 mol/l KOH, closely adjusted to a viscosity of 6 mPa·sec with glycerin and water, and then filtered through a microfilter having an average pore diameter of 0.25 μm under reduced pressure to prepare a light magenta ink solution (Sample 101LM).

| | |
|---|---|
| Magenta dye (a-36) | 9.5 g/L |
| Diethylene glycol | 150 g/L |
| Urea | 37 g/L |
| Diethylene glycol | 150 g/L |
| Glycerin | 130 g/L |
| Triethylene glycol monobutyl ether | 130 g/L |
| 2-Pyrrolidone | 40 g/L |
| Triethanolamine | 7 g/L |
| Benzotriazole | 0.07 g/L |
| PROXEL XL2 (2-benzoisothiazoline-3-on) | 5.0 g/L |
| Surface active agent (w-1) | 6.0 g/L |

(w-1)

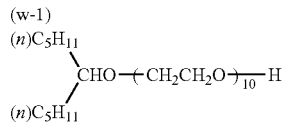

Further, the kind of dyes and additives were changed, and the solution was closely adjusted to a viscosity of 6 mPa·sec by changing the amount of glycerin and water to prepare a magenta ink (Sample 101M), a light cyan ink (Sample 101LC), a cyan ink (Sample 101C), a yellow ink (Sample 101Y) and black ink (Sample 101BK) from which an ink set 101 set forth in Table 14 was then prepared.

TABLE 14

| | Ink set | | | | | |
|---|---|---|---|---|---|---|
| | Light cyan | Cyan | Light magenta | Magenta | Yellow | Black |
| Dye (g/l) | A-2 | A-2 | a-36 | a-36 | A-4 | A-5 |
| | 17.5 | 68.0 | 9.5 | 30.2 | 28.0 | 20.0 |
| | | | | | | A-6 |
| | | | | | | 39.0 |
| | | | | | | A-7 |
| | | | | | | 17.0 |
| | | | | | | A-3 |
| | | | | | | 20.0 |
| Diethylene glycol (g/l) | 164 | 107 | 150 | 110 | 160 | 20 |
| Urea (g/l) | — | — | 37 | 46 | — | — |
| Glycerin (g/l) | 123 | 110 | 130 | 160 | 150 | 120 |
| Triethylene glycol monobutyl ether (g/l) | 119 | 127 | 130 | 140 | 130 | — |
| Diethylene glycol monobutyl | — | — | — | — | — | 230 |

TABLE 14-continued
| | Ink set | | | | | |
|---|---|---|---|---|---|---|
| | Light cyan | Cyan | Light magenta | Magenta | Yellow | Black |
| ether (g/l) | | | | | | |
| 2-Pyrrolidone (g/l) | — | 20 | 40 | — | — | 80 |
| Surface active agent (w-1) (g/l) | 10 | 10 | 6 | 12 | 3 | 5 |
| Triethanolamine (g/l) | 6.5 | 10 | 7 | 7 | 1 | 18 |
| Benzotriazole (g/l) | 0.07 | 0.09 | 0.07 | 0.08 | 0.06 | 0.08 |
| Proxel XL2 (g/l) | 1.0 | 4.0 | 5.0 | 4.5 | 3 | 4 |
Deionized water added to make 1 l
A-1
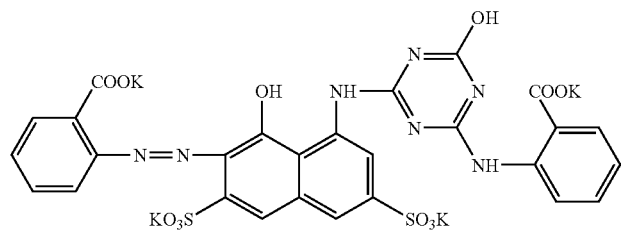
A-2
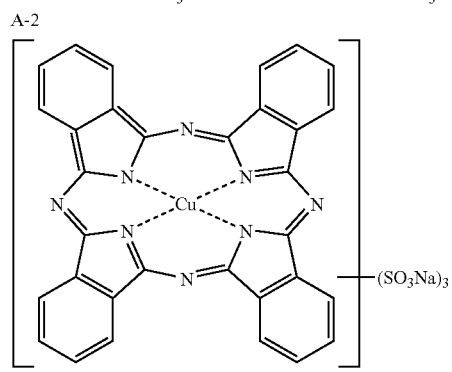
A-3
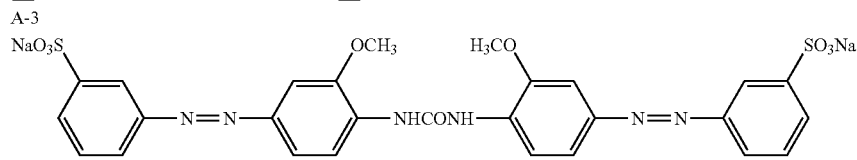
A-4
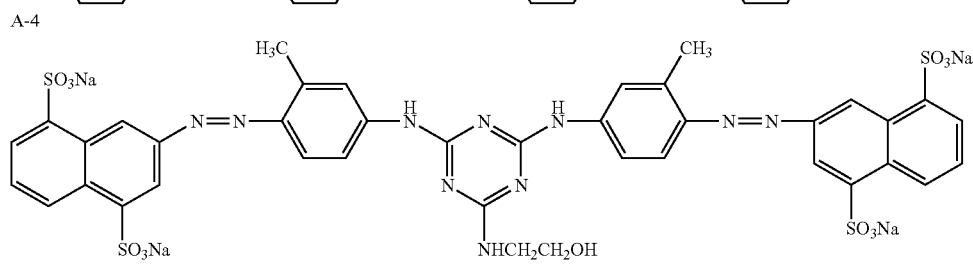
A-5
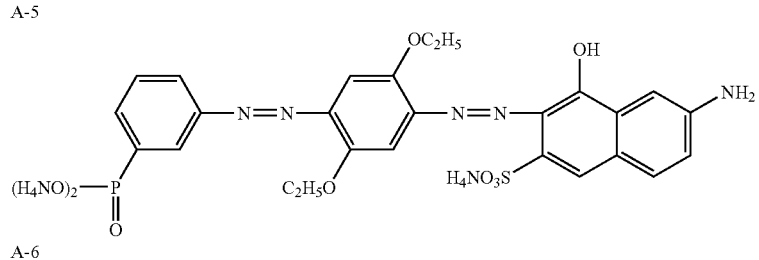
A-6

TABLE 14-continued

| | Ink set | | | | | |
|---|---|---|---|---|---|---|
| | Light cyan | Cyan | Light magenta | Magenta | Yellow | Black |

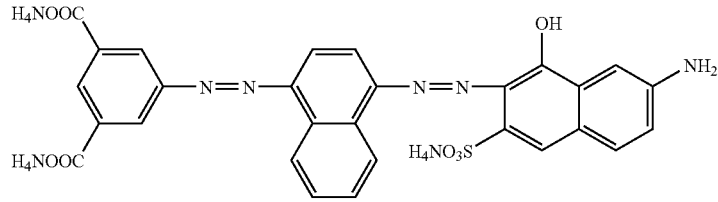

A-7

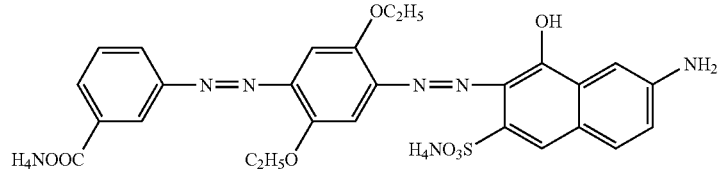

Subsequently, the kind of the dyestuff of the light magenta ink (Sample 101LM) and magenta ink (Sample 101M) of the ink set 101 were changed and the viscosity of the ink was changed according to Table 15 with glycerin and water to prepare ink sets 102 to 109.

The magenta dyes (a-36 and a-38) used herein exhibited the same oxidation potential (Eox) value of 1.0 V (vsSCE) when measured by any of dropping mercury electrode method using a 1 mmol/l aqueous solution of dye, cyclic voltammetry method and rotary ring disc electrode method.

TABLE 15

| Ink set | | Light magenta | Magenta | Remarks |
|---|---|---|---|---|
| 101 | Dye | a-36 | a-36 | Inventive |
| | viscosity | 6 mPa · sec | 6 mPa · sec | |
| 102 | Dye | a-36 | a-36 | Inventive |
| | viscosity | 6 mPa · sec | 5 mPa · sec | |
| 103 | Dye | a-36 | a-36 | Inventive |
| | viscosity | 4 mPa · sec | 4 mPa · sec | |
| 104 | Dye | a-38 | a-38 | Inventive |
| | viscosity | 10 mPa · sec | 6 mPa · sec | |
| 105 | Dye | a-38 | a-38 | Inventive |
| | viscosity | 5 mPa · sec | 10 mPa · sec | |
| 106 | Dye | a-36 | a-36 | Reference |
| | viscosity | 30 mPa · sec | 4 mPa · sec | |
| 107 | Dye | a-36 | a-36 | Reference |
| | viscosity | 30 mPa · sec | 30 mPa · sec | |
| 108 | Dye | a-36 | a-36 | Reference |
| | viscosity | 0.9 mPa · sec | 0.9 mPa · sec | |
| 109 | Dye | A-1 | A-1 | Comparative |
| | viscosity | 6 mPa · sec | 6 mPa · sec | |

Subsequently, the ink sets 101 to 109 were each packed in the cartridge of a Type PM800C ink jet printer (produced by EPSON CO., LTD.) by which an image was then printed on an ink jet paper photographic glossy paper EX produced by Fuji Photo Film Co., Ltd., and the image was then evaluated for the following properties.

<Ejection Stability (Printing Properties)>

For the evaluation of ejection stability (i), the cartridge was set in the printer in which the ejection of the ink through all the nozzles was then confirmed and printing was made on 20 sheets of A4 size paper to evaluate disturbance in print.

A: No disturbance in print between the beginning and the termination of printing;

B: Output generated with disturbance in print;

C: Disturbance in print between the beginning and the termination of printing

For the evaluation of ejection stability (ii), the cartridge was allowed to stand at 60° C. for 2 days, and then evaluated for disturbance in print in the same manner as in ejection stability □.

<Dryability>

For the evaluation of dryability, stain attached to finger when brought into contact with the image shortly after printing was visually evaluated.

○: Acceptable level, Δ: Slightly poor level, x: Unacceptable level

<Bleeding of Fine Line>

For the evaluation of fine line bleeding (i), a fine line pattern of yellow, magenta, cyan and black was printed and visually observed.

○: Acceptable level, Δ: Slightly poor level, x: Unacceptable level

For the evaluation of fine line bleeding (ii), for black, a magenta ink was solid-printed, a fine line of black was printed thereon, and bleeding by the contact of the two colors was then evaluated.

○: Acceptable level, Δ: Slightly poor level, x: Unacceptable level

<Water Resistance>

For the evaluation of water resistance, the image obtained was dipped in deionized water for 10 seconds, and then evaluated for bleeding.

○: Acceptable level, Δ: Slightly poor level, x: Unacceptable level

<Bleeding of Fine Line>

For the evaluation of fine line bleeding (i), a fine line pattern of yellow, magenta, cyan and black was printed and visually observed.

○: Acceptable level, Δ: Slightly poor level, x: Unacceptable level

<Hue>

For the evaluation of image preservability, a series of color patch samples having different magenta density gradations (same as the sample for measurement of fading rate constant) were prepared and visually compared with reference samples of ○, Δ and x for hue including color purity.

○: Acceptable level, Δ: Slightly poor level, x: Unacceptable level

<Light Fastness>

For the evaluation of light fastness, the density Ci of an image immediately after printing on the sample was measured using a reflection densitometer (X-Rite 310TR), and the sample was irradiated with xenon light (85,000 lux) for 7 days using a weather meter produced by Atlas, and then again measured for image density Cf to determine percent remaining of dye (100×Cf/Ci). The percent remaining of dye was evaluated at three reflection density points of 1, 1.5 and 2, and those showing a percent dye remaining of 85% or more at any density point were ranked A, those showing a percent dye remaining of less than 85% at two density points were ranked B, and those showing a percent dye remaining of less than 85% at all density points were ranked C.

For the evaluation of heat fastness, the sample was measured for density before and after storage under the condition at 80° C. and 70% RH for 7 days using a reflection densitometer (X-Rite 310TR) to determine percent dye remaining. The percent dye remaining was evaluated at three points of reflection density, i.e., 1, 1.5 and 2, and those showing a percent dye remaining of 90% or more at any of these reflection density points were ranked A, those showing a percent dye remaining of less than 90% at two of these reflection density points were ranked B, and those showing a percent dye remaining of less than 90% at all reflection density points were ranked C.

For the evaluation of ozone fastness, the sample was measured for density before and after storage in an atmosphere heated to 80° C. with external air taken therein using a reflection densitometer (X-Rite 310TR) to determine percent dye remaining. The percent dye remaining was evaluated at three points of reflection density, i.e., 1, 1.5 and 2, and those showing a percent dye remaining of 90% or more at any of these reflection density points were ranked A, those showing a percent dye remaining of less than 90% at two of these reflection density points were ranked B, and those showing a percent dye remaining of less than 90% at all reflection density points were ranked C.

The results thus obtained are set forth in Tables 16 and 17.

TABLE 16

| Ink set | Printing properties (i) | Printing properties (ii) | Dryability | Fine line bleeding (i) | Fine line bleeding (ii) | Water resistance |
|---|---|---|---|---|---|---|
| 101 | A | A | ○ | ○ | ○ | ○ |
| 102 | A | A | ○ | ○ | ○ | ○ |
| 103 | A | A | ○ | ○ | ○ | ○ |
| 104 | A | A | ○ | ○ | ○ | ○ |
| 105 | A | A | ○ | ○ | ○ | ○ |
| 106 | B | B | Δ | ○ | ○ | ○ |
| 107 | C | C | X | ○ | ○ | ○ |
| 108 | C | C | ○ | Δ | Δ | ○ |
| 109 | A | A | ○ | ○ | ○ | ○ |

TABLE 17

| Ink set | Light fastness | Heat fastness | Ozone fastness | Remarks |
|---|---|---|---|---|
| 101 | A | A | A | Inventive |
| 102 | A | A | A | Inventive |
| 103 | A | A | A | Inventive |
| 104 | A | A | A | Inventive |
| 105 | A | A | A | Inventive |
| 106 | A | A | A | Reference |
| 107 | A | A | A | Reference |
| 108 | A | A | A | Reference |
| 109 | B | B | C | Comparative |

It is apparent that when an ink the viscosity of which is adjusted to the range of the present invention is used, an excellent ejection stability can be obtained and excellent properties of water resistance and fastness can be exhibited as well. Further, the ink of the present invention exhibits excellent properties without bleeding during the output of fine line.

Moreover, the inks of the present invention (Samples 101LM, M to 105LM, M) provided the same hue as provided by the inks (Samples 109LM, M) comprising the dye A-1, which had been found to have an excellent hue.

Further, the inks of the present invention prepared in the same manner as in Example 1 except that other water-soluble dyes represented by the formula (1) were used instead of the magenta dye (a-36) had the same effect on weathering resistance, ejection stability and hue as that of Example 1.

It is known that the evaluation level B in the aforesaid ozone fastness evaluation corresponds to the aforementioned fading rate constant kd ($h^{-1}$) of 2.0.

Further, even when the image-receiving paper to be used in the present invention is changed to PM photographic paper produced by EPSON CO., LTD. or PR101 produced by Canon Inc., the same effects as mentioned above can be exerted.

Example 2

The same ink as prepared in Example 1 was packed in the cartridge of a Type BJ-F850 ink jet printer (produced by Canon Inc.) by which an image was then printed on an ink jet paper photographic gloss paper EX produced by Fuji Photo Film Co., Ltd. and evaluated in the same manner as in Example 1, and the same results as in Example 1 were obtained. Further, the same effects were exerted also with the case where the image-receiving paper was PM photographic paper produced by EPSON CO., LTD. or PR101 produced by Canon Inc.

Example 3

6 g of a dye (a-3), and 6.2 g of dioctylsulfosuccinic acid were dissolved in a mixture of 6 g of a high boiling organic solvent (s-1), 10 g of a high boiling organic solvent (s-2) and 50 ml of ethyl acetate at 70° C. To the solution was then added 500 ml of deionized water with stirring by a magnetic stirrer to prepare an oil-in-water type coarse grain dispersion.

Subsequently, the coarse grain dispersion was passed through a microfluidizer (MICROFLUIDEX INC) at a pressure of 60 MPa five times to undergo atomization. Further, the emulsion thus obtained was then subjected to desolvation by a rotary evaporator until there was no odor of ethyl acetate.

To the microfine emulsion of oil-soluble dye thus obtained were added additives such as 130 g of diethylene glycol, 64 g of glycerin, 13 g of a surface active agent (w-1) and urea and then added deionized water, and the emulsion was adjusted to pH 9 with 10 mol/l of KOH and to a viscosity of 5 mPa·sec by changing the amount of glycerin and water to prepare a light magenta ink (Sample 201LM) according to Table 18. The volume-average particle diameter of the emulsified dispersed ink thus obtained was 58 nm as determined using a microtrack UPA (Nikkiso Co., Ltd.).

Moreover, the kind of the dyes to be used and the high boiling organic solvents were changed to prepare a magenta ink (Sample 201M), a light cyan ink (Sample 201LC), a cyan ink (Sample 201C), a yellow ink (Sample 201Y) and a black ink (Sample 201BK) of ink set 201 set forth in Table 18 below.

|  | Light cyan | Cyan | Light magenta | Magenta | Yellow | Black |
|---|---|---|---|---|---|---|
| Dye (g/l) | C-1 7.0 | C-1 35.0 | a-3 6.0 | a-3 20.0 | Y-1 28.0 | C-1 19.0 M-1 10.0 Y-1 14.0 |
| High boiling organic solvent (g/l) | S-1 6.0 S-2 10.0 | 25.0 45.0 | 4.0 6.0 | 14.0 25.0 | 20.0 35.0 | 30.0 53.0 |
| Sodium dioctylsulfo-succinate (g/l) | 4.0 | 30.0 | 6.2 | 23.0 | 35.0 | 52.0 |
| Diethylene glycol (g/l) | 140 | 140 | 130 | 140 | 130 | 120 |
| Urea | 46.0 | 46.0 | 46.0 | 46.0 | 46.0 | 46.0 |
| Glycerin (g/l) | 64.0 | 64.0 | 64.0 | 64.0 | 64.0 | 64.0 |
| Triethanolamine (g/l) | 10 | 10 | 10 | 10 | 10 | 10 |
| Benzotriazole (g/l) | 0.08 | 0.08 | 0.08 | 0.08 | 0.08 | 0.08 |
| Surface active agent (w-1) (g/l) | 13 | 13 | 13 | 13 | 13 | 13 |
| Proxel XL2 (g/l) | 3.5 | 3.5 | 3.5 | 3.5 | 3.5 | 3.5 |
| Deionized water added to make 1 l | | | | | | |
| Volume-average particle diameter | 58 nm | 65 nm | 50 mn | 55 nm | 60 nm | 70 nm |

C-1

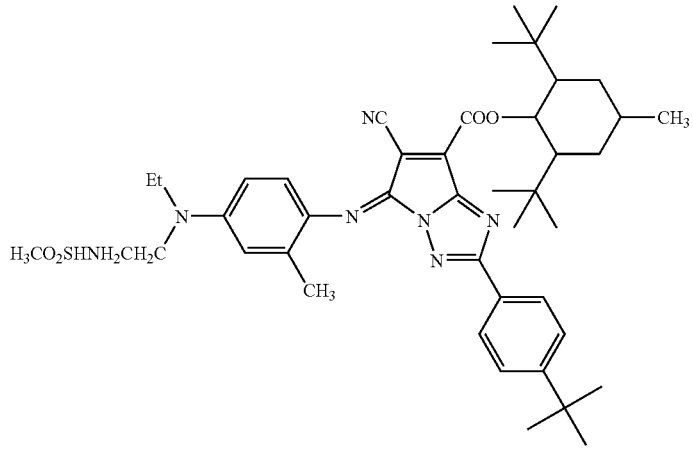

Y-1

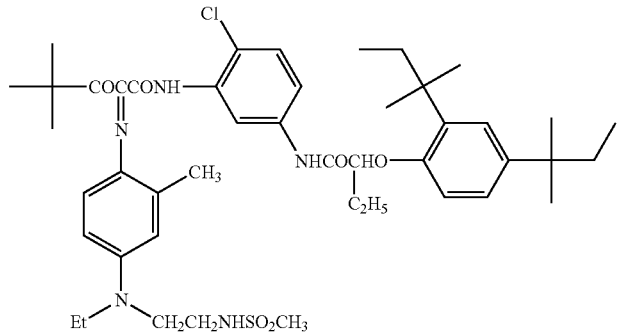

-continued

|   | Light cyan | Cyan | Light magenta | Magenta | Yellow | Black |
|---|---|---|---|---|---|---|

S-1

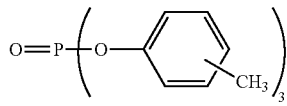

S-2

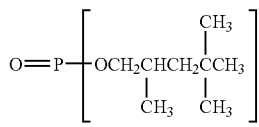

Similarly, ink sets 202 to 208, which have a magenta ink and a light magenta ink different from those described above, were prepared according to Table 19.

The added amount of the compound of the present invention was 2.0% by weight in all these ink sets.

Further, a comparative ink set 209 was prepared in the same manner as the ink set 201 except that the kind of dye was changed to M-1. Subsequently, these ink sets 201 to 209 were each packed in the cartridge of a Type PM770C ink jet printer (produced by EPSON CO., LTD.) by which an image was then printed on an ink jet paper photographic gloss paper EX produced by Fuji Photo Film Co., Ltd. and the image was then evaluated in the same manner as in Example 1. The results thus obtained are set forth in Table 19.

TABLE 19

| Ink set | Dye | Viscosity mPasec | Ejection stability (1) | Light fastness | Heat fastness | Ozone fastness | Water resistance | Fine line bleeding (i) | Fine line bleeding (ii) | Remarks |
|---|---|---|---|---|---|---|---|---|---|---|
| 201 | a-3 | 5 | A | A | A | A | A | o | o | Inventive |
| 202 | a-3 | 3 | A | A | A | A | A | o | o | Inventive |
| 203 | a-3 | 10 | A | A | A | A | A | o | o | Inventive |
| 204 | a-3 | 4 | A | A | A | A | A | o | o | Inventive |
| 205 | a-26 | 4 | A | A | A | A | A | o | o | Inventive |
| 206 | a-26 | 5 | A | A | A | A | A | o | o | Inventive |
| 207 | a-26 | 30 | C | A | A | A | A | o | o | Reference |
| 208 | a-26 | 0.9 | C | A | A | A | A | Δ | Δ | Reference |
| 209 | M-1 | 5 | A | A | A | B | A | o | o | Comparative |

M-1

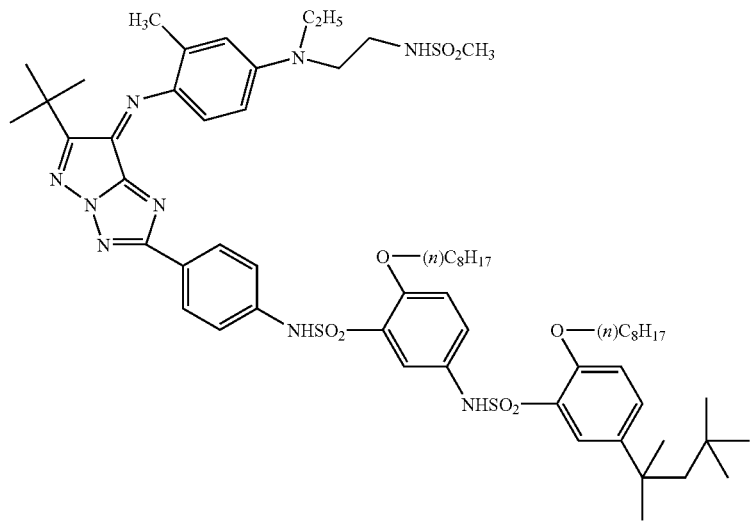

It is apparent that the ink of the present invention can provide a recorded image excellent all in ejection stability, weathering resistance (light, heat fastness and ozone fastness) and water resistance free of bleeding from fine line.

Further, the inks (201 to 208) of the present invention are the same as the ink (209) in respect of hue, but as indicated by the ink sets 207 and 208, when the viscosity deviates from the desired range, the ejection stability becomes unstable, and when the viscosity deviates from the desired range on the low value side, a tendency for more bleeding from fine line appears.

Moreover, the inks of the present invention prepared in the same manner as in Example 3 except that other oil-soluble dyes represented by the formula (1) were used instead of the magenta dye (a-3) or (a-26) exerted the same effect on weathering resistance, ejection stability and hue as in Example 3.

Example 4

To the following components was added deionized water to make 1 l, and the mixture was then heated to 30° C. to 40° C. with stirring for 1 hour. Thereafter, the solution was filtered through a microfilter having an average pore diameter of 0.25 μm under reduced pressure to prepare a light magenta ink.

| Magenta dye (a-36) | 10.2 g/L |
| Triethylene glycol monobutyl ether | 130 g/L |
| Glycerin | 130 g/L |
| Diethylene glycol | 150 g/L |
| Triethanolamine | 7.0 g/L |
| Benzotriazole | 0.07 g/L |
| PROXEL XL2 (2-benzoisothiazoline-3-on) | 5.0 g/L |
| Surface active agent | 6.0 g/L |

(Singly terminated 2-butyloctanoic acid ester of polyethylene glycol (average number of repetition of ethylene oxide: 10)

Further, the kind of dyes and the additives were changed to prepare a magenta ink, a light cyan ink, a cyan ink, a yellow ink and a black ink from which an ink set 301 set forth in Table 20 below was then prepared.

|  | Light magenta | Magenta | Light cyan | Cyan | yellow | Dark yellow | Black |
|---|---|---|---|---|---|---|---|
| Dye | (a-36) | (a-36) | A-2 | A-2 | A-3 | A-3 | A-5 |
|  | 10.2 g/l | 30.8 | 17.5 | 68 | 14.7 | 10.3 | 20.0 |
|  |  |  |  |  | A-4 | A-4 | A-6 |
|  |  |  |  |  | 14.0 | 9.8 | 39.0 |
|  |  |  |  |  |  | A-2 | A-7 |
|  |  |  |  |  |  | 13.6 | 17.0 |
|  |  |  |  |  |  |  | A-3 |
|  |  |  |  |  |  |  | 20.0 |
| Triethylene glycol monobutyl ether | 130 | 140 | 119 | 127 | 130 | 130 | — |
| Diethylene glycol monobutyl ether | — | — | — | — | — | — | 230 |
| Glycerin | 130 | 160 | 123 | 110 | 150 | 138 | 120 |
| Diethylene glycol | 150 | 110 | 164 | 107 | 160 | 144 | 20 |
| Triethanolamine | 7 | 7 | 6.5 | 10 | 1 | 4 | 18 |
| Urea | 37 | 46 | — | — | — | — | — |
| 2-Pyrrolidone | 40 | — | — | 20 | — | — | 80 |
| Proxel XLII (g/l) | 5.0 | 4.5 | 1.0 | 4.0 | 3.0 | 3.0 | 4.0 |
| Benzotriazole | 0.07 | 0.08 | 0.07 | 0.09 | 0.06 | 0.07 | 0.08 |
| Surface active agent | 6 | 12 | 10 | 10 | 3 | 5 | 5 |

A-2

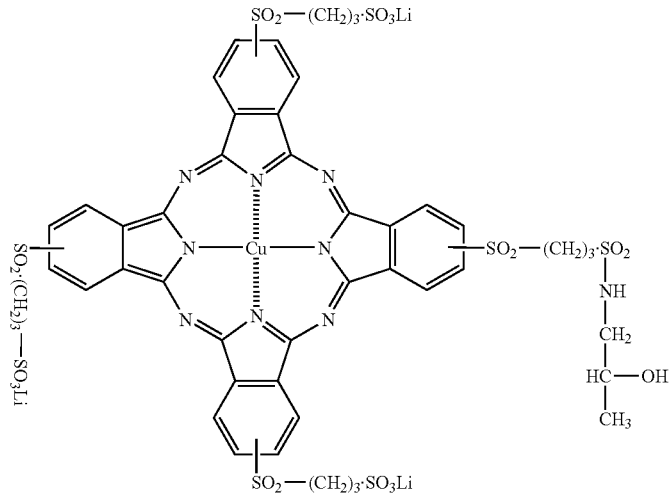

Subsequently, ink sets 302 to 307 were prepared in the same manner as the ink set 301 except that the amount of surface active agent and the kind and amount of organic solvent of the invention in light cyan ink and cyan ink were changed according to Tables 15 and 16 below. The static surface tension of these inks were measured using a Type CBVP-A3 automatic surface tension meter (Kyowa Interface Science Co., Ltd.). Further, the dynamic surface tension of these inks were measured using a Type BP-D3 automatic dynamic surface tension meter (Kyowa Interface Science Co., Ltd.).

TABLE 21

| Ink set | | Light magenta | Magenta | Static surface tension of light magenta | Dynamic surface tension of light magenta | Static surface tension of light magenta | Dynamic surface tension of light magenta | Remarks |
|---|---|---|---|---|---|---|---|---|
| 301 | Dye | a-36 | a-36 | 33.5 mN/m | 34.9 mN/m | 33.9 mN/m | 34.7 mN/m | Inventive |
| | Surface active agent | 6 | 12 | | | | | |
| | Diethylene glycol | 150 | 110 | | | | | |
| | Glycerin | 130 | 160 | | | | | |
| | Triethylene glycol monobutyl ether | 130 | 140 | | | | | |
| 302 | Dye | a-3 | a-36 | 33.9 | 35.9 | 33.7 | 34.6 | Inventive |
| | Surface active agent | 10 | 10 | | | | | |
| | Diethylene glycol | 30 | 35 | | | | | |
| | Glycerin | 5 | 8 | | | | | |
| | Triethylene glycol monobutyl ether | 50 | 47 | | | | | |
| 303 | Dye | a-36 | a-36 | 34.1 | 36.2 | 33.3 | 33.8 | Inventive |
| | Surface active agent | 10 | 10 | | | | | |
| | Diethylene glycol | 30 | 35 | | | | | |
| | Glycerin | 5 | 8 | | | | | |
| | Triethylene glycol monobutyl ether | — | — | | | | | |
| 304 | Dye | a-36 | a-36 | 37.8 | 38.9 | 38.9 | 38.9 | Inventive |
| | Surface active agent | 10 | 10 | | | | | |
| | Diethylene glycol | 150 | 110 | | | | | |
| | Glycerin | 130 | 130 | | | | | |
| | Triethylene glycol monobutyl ether | 130 | 140 | | | | | |
| 305 | Dye | a-36 | a-36 | 52.7 | 51.9 | 53.6 | 52.7 | Reference |
| | Surface active agent | — | — | | | | | |
| | Diethylene glycol | 30 | 35 | | | | | |
| | Glycerin | 5 | 3 | | | | | |
| | Triethylene glycol monobutyl ether | — | — | | | | | |
| 306 | Dye | a-36 | a-36 | 24.2 | 24.6 | 23.7 | 23.7 | Reference |
| | Surface active agent | 10 | 10 | | | | | |
| | Diethylene glycol | 150 | 110 | | | | | |
| | Glycerin | 130 | 130 | | | | | |
| | Triethylene glycol | 130 | 140 | | | | | |

TABLE 21-continued

| Ink set | | Light magenta | Magenta | Static surface tension of light magenta | Dynamic surface tension of light magenta | Static surface tension of light magenta | Dynamic surface tension of light magenta | Remarks |
|---|---|---|---|---|---|---|---|---|
| | monobutyl ether | | | | | | | |
| 307 | Dye | B-1 | B-2 | 32.3 | 33.7 | 32.3 | 33.1 | Comparative |
| | Surface active agent | 6 | 12 | | | | | |
| | Diethylene glycol | 150 | 110 | | | | | |
| | Glycerin | 130 | 160 | | | | | |
| | Triethylene glycol monobutyl ether | 130 | 140 | | | | | |

B-1

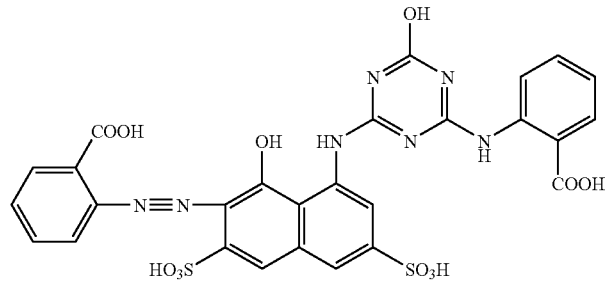

B-2

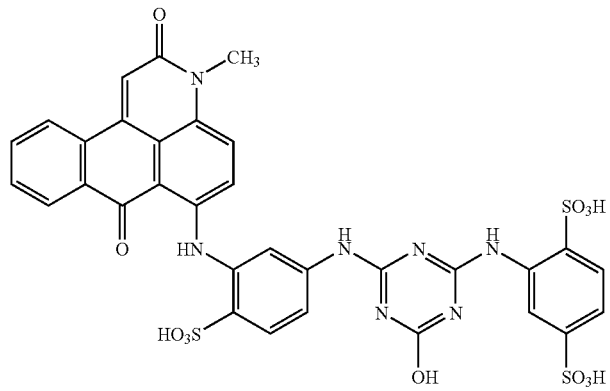

(Ink Jet Recording)

Subsequently, the ink sets 301 to 307 were each packed in the cartridge of a Type PM920C ink jet printer (produced by SEIKO EPSON CO., LTD.) by which an image was then printed on an ink jet paper photographic gloss paper EX produced by Fuji Photo Film Co., Ltd. and evaluated for the following properties.

The evaluation of ejection stability, dryability, fine line bleeding, water resistance and image preservability was carried out by the method described in Example 1.

The results thus obtained are set forth in Tables 22 and 23.

TABLE 22

| Ink set | Ejection stability (ii) | Ejection stability (ii) | Dryability | Fine line bleeding (i) | Fine line bleeding (i) | Water resistance |
|---|---|---|---|---|---|---|
| 301 | A | A | ○ | ○ | ○ | ○ |
| 302 | A | A | ○ | ○ | ○ | ○ |
| 303 | A | A | ○ | ○ | ○ | ○ |
| 304 | A | A | ○ | Δ | Δ | ○ |
| 305 | B | C | ○ | X | X | ○ |
| 306 | C | C | ○ | X | X | ○ |
| 307 | A | A | ○ | ○ | ○ | ○ |

TABLE 23

| Ink set | Light fastness | Heat fastness | Ozone fastness | Remarks |
|---|---|---|---|---|
| 301 | A | A | A | Inventive |
| 302 | A | A | A | Inventive |
| 303 | A | A | A | Inventive |
| 304 | A | A | A | Inventive |
| 305 | A | A | A | Reference |
| 306 | A | A | A | Reference |
| 307 | C | A | C | Comparative |

It is apparent that when the ink of the present invention is used, an excellent ejection stability can be obtained and excellent properties of water resistance and fastness can be exhibited as well. Further, the ink of the present invention exhibits excellent properties without bleeding during the output of fine line.

Further, the inks of the present invention prepared in the same manner as in Example 1 except that other water-soluble dyes represented by the formula (1) were used instead of the magenta dye (a-36) had the same effect on weathering resistance, ejection stability and hue as that of Example 1. However, Samples 305 and 306, which are inventive but deviate from the desired range of dynamic surface tension and static surface tension, were ejected less stably and caused more bleeding from fine line.

Moreover, the inks of the present invention (Samples 301 to 306) provided the same hue as provided by the ink (Sample 307) comprising the dyes B-1 and B-2, which had been found to have an excellent hue.

Further, even when the image-receiving paper to be used in the present invention is changed to PM photographic paper produced by EPSON CO., LTD. or PR101 produced by Canon Inc., the same effects as mentioned above can be exerted.

Example 5

To the following components was added deionized water to make 1 l, and the mixture was then heated to from 30° C. to 40° C. with stirring for 1 hour. Thereafter, the solution was adjusted to a pH value with a 1 mol/l hydrochloric acid or KOH, and then filtered through a microfilter having an average pore diameter of 0.25 μm under reduced pressure to prepare a light magenta ink.

| | |
|---|---|
| Magenta dye (a-36) | 7.5 g/l |
| Diethylene glycol | 150 g/l |
| Urea | 37 g/l |
| Glycerin | 130 g/l |
| Triethylene glycol monobutyl ether | 130 g/l |
| Triethanolamine | 6.9 g/l |
| Benzotriazole | 0.08 g/l |
| PROXEL XL2 (2-benzoisothiazoline-3-on) | 3.5 g/l |
| Surfinol STG | 10 g/l |

Further, a magenta ink was prepared in the same manner as mentioned above except that the amount of the magenta dye (a-36) was increased to 23 g. The electrical conductance of these magenta inks and light magenta inks were adjusted by changing the amount of solvent (glycerin, triethylene glycol monobutyl ether, diethylene glycol) and with lithium chloride (401 to 406), and the electrical conductance of magenta ink and light magenta ink for PM-950C of EPSON CO., LTD. were adjusted (407 to 410)(Table 24).

Subsequently, the inks 401 to 410 were each packed in the magenta and light magenta portions of the cartridge of a Type PM770C ink jet printer (produced by EPSON CO., LTD.) by which an image was then printed on an ink jet paper photographic gloss paper EX produced by Fuji Photo Film Co., Ltd. and evaluated for ejection stability and image fastness.

The evaluation of ejection stability and image preservability was carried out by the method described in Example 1.

TABLE 24

| Ink No. | Conductance of light magenta ink (S/m) | Conductance of magenta ink (S/m) | Light fastness | Heat fastness | Ozone fastness | Ejection stability |
|---|---|---|---|---|---|---|
| 401 | 0.009 | 0.009 | A | D | A | B |
| 402 | 0.025 | 0.026 | A | A | A | A |
| 403 | 0.352 | 0.552 | A | A | A | A |
| 404 | 0.986 | 0.946 | A | A | A | A |
| 405 | 1.21 | 1.01 | A | A | A | A |
| 406 | 11.0 | 11.3 | A | D | A | B |
| 407 | 0.313 | 0.422 | B | B | C | A |
| 408 | 0.962 | 0.946 | B | B | C | A |
| 409 | 1.11 | 1.23 | B | B | C | A |
| 410 | 10.5 | 10.9 | B | D | C | B |

It is apparent that the inks (402 to 405, 407 to 409) the conductance of which fall within the desired range of the present invention are excellent in ejection stability as compared with the inks (401, 405, 410), but only the inks (402 to 405) comprising the magenta dye according to the present invention are excellent in both ejection stability and weathering resistance (light fastness, heat fastness, and ozone fastness). In other words, it is apparent that among the inks of the present invention, those having an adjusted ink conductance can exert a remarkable effect, particularly on heat fastness. At the same time, an excellent ejection stability can be obtained.

Further, the inks of the present invention (402 to 405, 407 to 409) exhibited the same hue as the inks (407 to 410).

Moreover, the inks of the present invention prepared in the same manner as in Example 1 except that other dyes represented by the formula (1) were used instead of the magenta dye (a-36) exerted the same effect on weathering resistance, ejection stability and hue as in Example 1.

Example 6

(Preparation of Ink Solution)

To the following components was added deionized water to make 1 l, and the mixture was then heated to from 30° C. to 40° C. with stirring for 1 hour. Thereafter, the solution was filtered through a microfilter having an average pore diameter of 0.25 μm under reduced pressure to prepare a light magenta ink solution (Sample 501LM).

| (Components of light magenta ink solution) | |
| --- | --- |
| Magenta dye (Exemplary Compound a-36) | 9.5 g |
| Diethylene glycol | 47 g |
| Urea | 37 g |
| Glycerin | 198 g |
| Triethylene glycol monobutyl ether | 105 g |
| 2-Pyrrolidone | 40 g |
| Triethanolamine | 7 g |
| Benzotriazole | 0.07 g |
| PROXEL XL2 (2-benzoisothiazoline-3-on) | 5.0 g |
| Surface active agent (w-1) | 10 g |

The kind of dyes and the additives were changed to prepare a magenta ink (Sample 501M), a light cyan ink (Sample 501LC), a cyan ink (Sample 501C), a yellow ink (Sample 501Y) and a black ink (Sample 501BK) from which an ink set 501 set forth in Table 25 was then prepared.

The ink viscosity was measured using a Type VM-100A-L vibration type viscometer (YAMAICHI ELECTRONICS Co., Ltd.). Further, static surface tension was measured using a Type CBVP-A3 automatic surface tension meter (Kyowa Interface Science Co., Ltd.). The percent change of viscosity and surface tension at 10° C. from at 25° C. were calculated from these measurements by the method described above.

Further, a chart of the temperature dependence of viscosity and surface tension of magenta and light magenta of the ink set 501 is shown in FIGS. 1 and 2 respectively.

Subsequently, ink sets 502 to 506 were prepared in the same manner as the aforementioned ink set 501 except that the percent change of viscosity and surface tension of magenta and light magenta inks at 10° C. from at 25° C. were changed as set forth in Table 26 below by changing the added amount of the water-miscible organic solvent and the surface active agent.

TABLE 26

| Ink set | Dyestuff | | Percent viscosity change | Percent change of static surface tension | Remarks |
| --- | --- | --- | --- | --- | --- |
| 501 | Light magenta | a-36 | 190 | 108 | Inventive |
|  | Magenta | a-36 | 188 | 105 |  |
| 502 | Light magenta | a-38 | 175 | 106 | Inventive |
|  | Magenta | a-38 | 176 | 105 |  |
| 503 | Light magenta | a-33 | 182 | 107 | Inventive |
|  | Magenta | a-33 | 182 | 107 |  |
| 504 | Light magenta | a-36 | 255 | 105 | Reference |
|  | Magenta | a-36 | 260 | 106 |  |
| 505 | Light magenta | a-36 | 255 | 137 | Reference |
|  | Magenta | a-36 | 260 | 138 |  |

| | Light cyan | Cyan | Light magenta | Magenta | Yellow | Dark yellow | Black |
| --- | --- | --- | --- | --- | --- | --- | --- |
| Dye (g/l) | A-2 17.5 | A-2 68.0 | a-36 9.5 | a-36 30.2 | A-3 14.0 A-4 14.0 | A-3 10.0 A-4 10.0 A-2 13.0 | A-5 20.0 A-6 39.0 A-7 17.0 A-3 20.0 |
| Diethylene glycol (g/l) | 167 | — | 47 | 76 | 85 | — | 20 |
| Urea (g/l) | — | — | 37 | 46 | — | 147 | — |
| Glycerin (g/l) | 164 | 148 | 198 | 150 | 154 | 127 | 120 |
| Triethylene glycol monobutyl ether (g/l) | 125 | 132 | 105 | 107 | 130 | — | 0 |
| Diethylene glycol monobutyl ether (g/l) | — | — | — | — | — | — | 230 |
| 2-Pyrrolidone (g/l) | — | 20 | 40 | — | — | — | 80 |
| Surface active agent (g/l) | 10 | 10 | 6 | 12 | 3 | 3 | 5 |
| Triethanolamine (g/l) | 6.5 | 10 | 7 | 7 | 1 | 1 | 18 |
| Benzotriazole (g/l) | 0.07 | 0.09 | 0.07 | 0.08 | 0.06 | 0.08 | 0.08 |
| Proxel XL2 (g/l) | 1 | 4.0 | 5.0 | 4.5 | 3 | 5 | 4 |
| Percent change at 10° C. from at 25° C. | | | | | | | |
| Viscosity | 180 | 183 | 190 | 188 | 183 | 188 | 192 |
| Surface tension | 107 | 105 | 108 | 105 | 106 | 109 | 108 |

Deionized water added to make 1 l

TABLE 26-continued

| Ink set | Dyestuff | | Percent viscosity change | Percent change of static surface tension | Remarks |
|---|---|---|---|---|---|
| 506 | Light magenta | A-1 | 180 | 107 | Comparative |
| | Magenta | A-1 | 182 | 105 | |

The ink sets 501 to 506 thus prepared were each packed in the cartridge of a Type PM920C ink jet printer (produced by SEIKO EPSON CO., LTD.) by which an image was then printed on an ink jet paper photographic gloss paper EX produced by Fuji Photo Film Co., Ltd. and evaluated for the following properties.

The ejection stability (referred to as "printing property in the table of results) and the preservability and hue with respect to image writing laser were evaluated by the method described in Example 1.

The results thus obtained are set forth in Table 27.

TABLE 27

| Ink set | Printing property 1 | Printing property 2 | Light fastness | Heat fastness | Ozone gas fastness | Hue | Remarks |
|---|---|---|---|---|---|---|---|
| 501 | A | A | A | A | A | ○ | Inventive |
| 502 | A | A | A | A | A | ○ | Inventive |
| 503 | A | A | A | A | A | ○ | Inventive |
| 504 | A | C | A | A | A | ○ | Reference |
| 505 | B | C | A | A | A | ○ | Reference |
| 506 | A | A | B | B | C | ○ | Comparative |

The results set forth in Table 27 show that the inks of the present invention (Samples 501 to 505) exhibit an excellent image preservability as compared with Comparative Example 506, but among the inks of the present invention, those having rates of change of a viscosity and a surface tension adjusted to a desired range (Samples 501 to 503) can exhibit an enhanced ejection stability printing performance when used in ink jet recording.

Further, even when the image-receiving paper to be used in the present invention is changed to PM photographic paper produced by EPSON CO., LTD. or PR101 produced by Canon Inc., the same effects as mentioned above can be exerted.

Example 8

The same ink as prepared in Example 7 was packed in the cartridge of a Type BJ-F850 ink jet printer (produced by Canon Inc.) by which an image was then printed on an ink jet paper photographic gloss paper EX produced by Fuji Photo Film Co., Ltd. and was evaluated in the same manner as in Example 7, and the same results as in Example 7 were then obtained. Further, the same effect was exerted also with the case of PM photographic paper produced by EPSON CO., LTD. or PR101 produced by Canon Inc.

Example 9

(Preparation of Ink Solution)

To 10.2 g of a magenta dye [a-36] was added 100 cc of deionized water, and the dye was then dissolved with stirring for 10 minutes while being given sound vibration using an ultrasonic cleaner (Type 2510J-DTH, produced by BRANSON INC.; 42 kHz, 125 W) (first step). To the dye solution were added the following components and then added deionized water to make 1 l, and the mixture was stirred while being heated to 30° C. to 40° C. for 1 hour (second step). Thereafter, the mixture was filtered through a microfilter having an average pore diameter of 0.25 μm under reduced pressure to prepare a light magenta ink solution (Sample 701LM).

| | |
|---|---|
| Triethylene glycol monobutyl ether | 130.0 g |
| Glycerin | 130.0 g |
| Diethylene glycol | 150.0 g |
| Triethanolamine | 7.0 g |
| Urea | 37.0 g |
| PROXEL KL2 (2-benzoisothiazoline-3-on) | 5.0 g |
| Benzotriazole | 0.07 g |
| Surface active agent | 6.0 g |

(Singly-terminated 2-butyloctanoic acid ester of polyethylene glycol (average number of repetition of ethylene oxide: 10)

Subsequently, to 30.8 g of a magenta dye [a-36] was added 300 cc of deionized water, and the dye was then dissolved with stirring for 10 minutes while being given sound vibration using the aforementioned ultrasonic cleaner. To the dye solution were added the following components and then added deionized water to make 1 l, and the mixture was stirred while being heated to 30° C. to 40° C. for 1 hour. Thereafter, the mixture was filtered through a microfilter having an average pore diameter of 0.25 μm under reduced pressure to prepare a magenta ink solution (Sample 701M).

| | |
|---|---|
| Triethylene glycol monobutyl ether | 140.0 g |
| Glycerin | 160.0 g |
| Diethylene glycol | 110.0 g |
| Triethanolamine | 7.0 g |
| Urea | 46.0 g |
| PROXEL XL2 (2-benzoisothiazoline-3-on) | 4.5 g |
| Benzotriazole | 0.08 g |
| Surface active agent | 12.0 g |

(Singly-terminated 2-butyloctanoic acid ester of polyethylene glycol (average number of repetition of ethylene oxide: 10)

Example 10

A light magenta ink solution (Sample 801LM) and a magenta ink (Sample 801M) were prepared in the same manner as in Example 9 except that no sound vibration was applied at the step of dissolving the magenta dye with deionized water with stirring for 1 hour and sound vibration was applied using an ultrasonic cleaner at the step of stirring and mixing the aqueous dye solution with the rest of the components under heating to 30° C. to 40° C. for 30 minutes.

(Comparative Sample 1)

A magenta ink solution and a light magenta ink solution were prepared as Comparative Sample 1 in the same manner as in Example 9 except that as the magenta dye and the light magenta dye there were used (B-1) and (B-2), respectively.

Example 11

A light magenta ink solution and a magenta ink solution were prepared as Example 11 in the same manner as in Example 9 except that no sound vibration was applied during the preparation of the ink solution.

Example 12

The ink solutions prepared in the same manner as in Example 11 were subjected to sound vibration using an ultrasonic cleaner for 1 hour to prepare a light magenta ink solution (Sample 901LM) and a magenta ink solution (Sample 901M)

(Ink Jet Recording)

The light magenta ink and magenta ink samples thus produced were each packed in the cartridge of a Type PM920C ink jet printer (produced by SEIKO EPSON CO., LTD.) by which an image was then printed on an ink jet paper photographic gloss paper EX produced by Fuji Photo Film Co., Ltd. and evaluated for ejection stability and image preservability by the method described in Example 1. The results are set forth in Table 28.

TABLE 28

| Ink | Dye | Sound vibration | Ejection stability | Light fastness | Heat fastness | Ozone fastness |
|---|---|---|---|---|---|---|
| Example 9 | (a-36) | Applied at 1st step | ○ | A | A | A |
| Example 10 | (a-36) | Applied at 2nd step | ○ | A | A | A |
| Comparative | (B-1), (B-2) | Applied at 1st step | ○ | C | A | C |
| Example 11 | (a-36) | No sound vibration applied | X | A | A | A |
| Example 12 | (a-36) | Applied after ink preparation | Δ | A | A | A |

In the results set forth in Table 28, the comparison of Examples 9 to 11 with Comparative Samples 1 and 2 shows that the application of ultrasonic vibration at the production procedure of the inks of the present invention (Samples 701 to 901) makes it possible to further enhance ejection stability (printing properties) when used in ink jet recording. In particular, it was also demonstrated that the effect can be exerted more by applying ultrasonic vibration at the preparation procedure than after the preparation of ink.

Example 13

Using the formulation of the magenta ink (Sample 101M) and light magenta ink (Sample 101LM) used in Example 1, filtration and defoaming tests at the ink production procedure were conducted as follows.

These inks were each packed in the cartridge of magenta ink and light magenta ink for Type PM-950C ink jet printer produced by SEIKO EPSON CO., LTD., but the ink loading was conducted with a step of filtering the ink through a filter, a step of defoaming the ink by an ultrasonic defoaming apparatus for 10 minutes and the cleanness of the steps being changed as mentioned below.

TABLE 29

| Experiment No. | Filtered | Filter pore diameter | Ultrasonically defoamed | Cleanness* |
|---|---|---|---|---|
| 901 | No | — | No | 100,000 |
| 902 | Yes | 250 nm | No | 100,000 |
| 903 | Yes | 250 nm | Yes | 100,000 |
| 904 | Yes | 50,000 nm | Yes | 100,000 |
| 905 | Yes | 50,000 nm | No | 800 |
| 906 | Yes | 250 nm | No | 800 |
| 907 | Yes | 50,000 nm | Yes | 800 |
| 908 | Yes | 250 nm | Yes | 800 |
| 909 | Yes | 100 nm | Yes | 800 |
| 910 | Yes | 500 nm | Yes | 800 |

*Cleanness indicates measurement of duster counter

The various inks other than the aforementioned magenta and light magenta inks were each printed to form a monochromatic image of magenta with the inks for PM-950C left loaded on a type PM-950C ink jet printer produced by EPSON CO., LTD. The image was printed on an ink jet paper photographic gloss paper EX produced by Fuji Photo Film Co., Ltd. as an image-receiving sheet to evaluate the image fastness thereof.

These inks were each subjected to the following ejection stability evaluation by the test method described in Example 1.

The results thus obtained are set forth in Table 30.

TABLE 30

| Experiment No. | Ejection stability |
|---|---|
| 901 | C |
| 902 | B |
| 903 | B |
| 904 | C |
| 905 | B |
| 906 | B |
| 907 | B |
| 908 | A |
| 909 | A |
| 910 | A |

It was confirmed from the results of the table that in Experiment Nos. 901 to 904, which have a low atmospheric cleanness, the effect of cleanness is dominant, but in the experiments in controlled atmosphere (Experiment Nos. 905 to 910), only Experiment Nos. 908 to 910, among the experiments using the ink seta of the invention in which the inks were filtered through a filter having a pore diameter of 1,000 μm or less (particularly from 100 μm to 500 μm) and defoamed, provided evaluation A in ejectability, showing a distinct difference in stability from Experiment Nos. 905 to 907, in which no defoamation was conducted. This makes it apparent that the effect of the present invention can be exerted more when filtration through a filter having a predetermined pore diameter and defoamation are conducted.

INDUSTRIAL APPLICABILITY

In accordance with the present invention, an ink set for ink jet recording can be provided, which provides assured hue of magenta ink, exhibits an excellent weathering resistance and a high ejection stability, causes no defects in water resistance and image quality and gives practical properties in handleability, odor, safety, etc. as well.

The invention claimed is:

1. An ink for ink jet recording, comprising an aqueous medium and a magenta dye dissolved or dispersed in the aqueous medium, the magenta dye being selected from azo dyes, wherein the magenta dye has an absorption maximum in a spectral range of from 500 to 580 nm in the aqueous medium and an oxidation potential of more positive than 1.0 V (vs SCE), and the azo dye is a dye represented by the following formula (1): Formula (1)

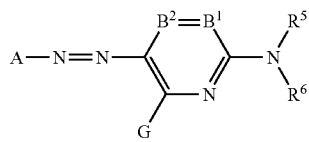

wherein A represents a 5-membered heterocyclic ring group; $B^1$ and $B^2$ each represents =$CR^1$— or —$CR^2$= or one of $B^1$ and $B^2$ represents a nitrogen atom while other represents =$CR^1$— or —$CR^2$=; $R^5$ and $R^6$ each independently represents a hydrogen atom or a substituent which is an aliphatic group, an aromatic group, a heterocyclic ring, an acyl group, an alkoxycarbonyl group, an aryloxycarbonyl group, a carbamoyl group, an alkylsulfonyl group, an arylsulfonyl group or a sulfamoyl group, a hydrogen atom of the substituent may be substituted: G, $R^1$ and $R^2$ each independently represents a hydrogen atom or a substituent which is a halogen atom, an aliphatic group, an aromatic group, a heterocyclic ring group, a cyano group, a carboxyl group, a carbamoyl group, an alkoxycarbonyl group, an aryloxycarbonyl group, a heterocyclic oxycarbonyl group, an acyl group, a hydroxy group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group, an acylamino group, an ureido group, a sulfamoylamino group, an alkoxycarbonylamino group, an aryloxycarbonylamino group, an alkylsulfonylamino group, an arylsulfonylamino group, a heterocyclic sulfonylamino group, a nitro group, an alkylthio group, an arylthio group, a heterocyclic thio group, an alkylsulfonyl group, an arylsulfonyl group, a heterocyclic sulfonyl group, an alkylsulfinyl group, an arylsulfinyl group, a heterocyclic sulfinyl group, a sulfamoyl group or a sulfo group, wherein a hydrogen atom of the substituent may be substituted; and $R^1$ and $R^5$ or $R^5$ and $R^6$ may be connected to each other to form a 5- or 6-membered ring.

2. The ink for ink jet recording according to claim 1, wherein the azo dye has one of an aromatic cyclic amino group and a heterocyclic amino group-containing structure as an auxochrome.

3. The ink for ink jet recording according to claim 1, wherein the azo dye has a stereostructure.

4. The ink for ink jet recording according to claim 1, wherein the ink has an ozone fading rate constant of a recorded image, the ozone fading rate constant is $5.0×10^{-2}[hr^{-1}]$ or less.

5. The ink for ink jet recording according to claim 1, which has a viscosity of from 1 to 20 mPa·sec at 25° C.

6. The ink for ink jet recording according to claim 1, which has a static surface tension of from 25 to 50 mN/m at 25° C.

7. The ink for ink jet recording according to claim 1, which has an electrical conductance of from 0.01 to 10 S/m.

8. The ink for ink jet recording according to claim 1, wherein a change of a viscosity and a surface tension of the ink from at 25° C. to at 10° C. are 250% or less and 130% or less, respectively.

9. The ink for ink jet recording according to claim 1, wherein the ink has no visibly detectable bleeding on an image-receiving material at a visible distance, the image-receiving material comprises an image-receiving layer on a support, and the image-receiving layer contains a white inorganic pigment particle.

10. The ink for ink jet recording according to claim 1, which has no visibly detectable bleeding on an image-receiving material at a visible distance, the image-receiving material comprising a gelatin-containing hardened layer as an image-recording layer.

11. A method for producing the ink for ink jet recording according to claim 1,
which comprises a step of dissolving or dispersing the azo dye in the aqueous medium with an ultrasonic agitation.

12. A method for producing the ink for ink jet recording according to claim 1,
which comprises steps of: filtering the aqueous medium having the azo dye dissolved or dispersed in the aqueous medium through a filter having an effective pore diameter of 1 µm or less; and defoaming the filtered aqueous medium.

13. An ink jet recording method using the ink for ink jet recording according to claim 1.

14. The ink jet recording method according to claim 13, wherein an ink droplet is ejected onto an image-receiving material in accordance with a recording signal so that an image is recorded on the image-receiving material by using the ink for ink jet recording, the image-receiving material comprising an image-receiving layer on a support, the image-receiving layer containing a white inorganic pigment particle.

15. The ink jet recording method according to claim 14, wherein the image-receiving layer contains the white inorganic pigment particle and at least one aqueous binder selected from the group consisting of a polyvinyl alcohol, a silanol-modified polyvinyl alcohol, a starch, a cationated starch, a gelatin, a carboxyalkyl cellulose, a casein and a polyvinyl pyrrolidone.

16. The ink jet recording method according to claim 15, wherein the image-receiving layer further contains a mordant selected from the group consisting of a polyaluminum chloride, a chromium compound and an azo dye-mordanting group-containing polymer.

* * * * *

UNITED STATES PATENT AND TRADEMARK OFFICE
CERTIFICATE OF CORRECTION

PATENT NO. : 7,201,477 B2
APPLICATION NO. : 10/502388
DATED : April 10, 2007
INVENTOR(S) : Toshiki Taguchi, Manabu Ogawa and Takashi Ozawa It is certified that error appears in the above-identified patent and that said Letters Patent is hereby corrected as shown below:

At line 53 of Column 2, please delete "Clauses" and insert therefor --Paragraphs--.
At line 54 of Column 2, please delete "Clauses" and insert therefor --Paragraphs--.
At line 56 of Column 2, please delete "Clauses" and insert therefor --Paragraphs--.
At line 56 of Column 2, please insert --.-- in between "(15)" and "Advantages".
At line 60 of Column 2, please delete "Clauses" and insert therefor --Paragraphs--.
At line 1 of Column 3, please delete "claim" and insert therefor --Paragraph--.
At line 9 of Column 3, please delete "Claim" and insert therefor --Paragraph--.
At line 15 of Column 3, please delete "Claims" and insert therefor --Paragraphs--.
At line 19 of Column 3, please delete "Claims" and insert therefor --Paragraphs--.
At line 21 of Column 3, please delete "Claims" and insert therefor --Paragraphs--.
At line 65 of Column 3, please delete "Claims" and insert therefor --Paragraphs--.
At line 2 of Column 4, please delete "Claims" and insert therefor --Paragraphs--.
At line 5 of Column 4, please delete "Claims" and insert therefor --Paragraphs--.
At line 8 of Column 4, please delete "Claims" and insert therefor --Paragraphs--.
At line 11 of Column 4, please delete "Claims" and insert therefor --Paragraphs--.
At line 15 of Column 4, please delete "Claims" and insert therefor --Paragraphs--.
At line 21 of Column 4, please delete "Claims" and insert therefor --Paragraphs--.
At line 26 of Column 4, please delete "Claims" and insert therefor --Paragraphs--.
At line 28 of Column 4, please delete "Claims" and insert therefor --Paragraphs--.
At line 31 of Column 4, please delete "Claims" and insert therefor --Paragraphs--.
At line 33 of Column 4, please delete "Claims" and insert therefor --Paragraphs--.
At line 38 of Column 4, please delete "Claims" and insert therefor --Paragraphs--.
At line 39 of Column 4, please delete "Claim" and insert therefor --Paragraph--.
At line 44 of Column 4, please delete "Claims" and insert therefor --Paragraphs--.
At line 47 of Column 4, please delete "Claim" and insert therefor --Paragraph--.

UNITED STATES PATENT AND TRADEMARK OFFICE
CERTIFICATE OF CORRECTION

PATENT NO. : 7,201,477 B2
APPLICATION NO. : 10/502388
DATED : April 10, 2007
INVENTOR(S) : Toshiki Taguchi, Manabu Ogawa and Takashi Ozawa It is certified that error appears in the above-identified patent and that said Letters Patent is hereby corrected as shown below:

At line 54 of Column 4, please delete "Claim" and insert therefor --Paragraph--.
At line 11 of Column 5, please delete "following clauses" and insert therefor --preceding Paragraphs--.

Signed and Sealed this

Twenty Second Day of April, 2008

JON W. DUDAS
*Director of the United States Patent and Trademark Office*